(12) United States Patent
Seong et al.

(10) Patent No.: US 9,144,037 B2
(45) Date of Patent: Sep. 22, 2015

(54) INTERFERENCE MITIGATION BY PUNCTURING TRANSMISSION OF INTERFERING CELLS

(75) Inventors: Kibeom Seong, West New York, NJ (US); Tao Luo, San Diego, CA (US); Taesang Yoo, San Diego, CA (US); Xiaoxia Zhang, San Diego, CA (US); Dung Ngoc Doan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 12/853,168

(22) Filed: Aug. 9, 2010

(65) Prior Publication Data

US 2011/0190024 A1    Aug. 4, 2011

Related U.S. Application Data

(60) Provisional application No. 61/233,107, filed on Aug. 11, 2009.

(51) Int. Cl.
*H04B 7/00* (2006.01)
*H04W 52/32* (2009.01)
(Continued)

(52) U.S. Cl.
CPC ........... *H04W 52/322* (2013.01); *H04L 1/0069* (2013.01); *H04L 1/0072* (2013.01); *H04W 52/244* (2013.01); *H04L 1/0045* (2013.01); *H04W 72/082* (2013.01); *H04W 84/045* (2013.01); *Y02B 60/50* (2013.01)

(58) Field of Classification Search
CPC . H04L 27/2613; H04L 5/0048; H04L 5/0007; H04L 2025/03426; H04L 5/005; H04L 1/0069
USPC .............................. 455/436, 435.2, 422.1, 443
See application file for complete search history.

(56) References Cited

U.S. PATENT DOCUMENTS 4,857,863 A    8/1989   Ganger et al.
5,051,625 A    9/1991   Ikeda et al.
(Continued)

FOREIGN PATENT DOCUMENTS

CN    1311968 A       9/2001
CN    101018220 A    8/2007
(Continued)

OTHER PUBLICATIONS

3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009, pp. 1-77, XP002602609.

(Continued)

*Primary Examiner* — Tu X Nguyen
(74) *Attorney, Agent, or Firm* — Dalei Dong

(57) ABSTRACT

Systems and methodologies are described that facilitate controlling interference in a heterogeneous wireless communication environment. A Physical Broadcast Channel (PBCH) transmission from an interfering base station can be punctured based upon a puncturing pattern as a function of a cell identifier (ID) and a transmit time. Puncturing can be effectuated by applying power control. Thus, a punctured symbol or subframe can have a reduced transmit power or a transmit power set to zero. Further, the puncturing pattern can be defined on a subframe basis or on a symbol basis.

41 Claims, 15 Drawing Sheets

(51) Int. Cl.
*H04L 1/00* (2006.01)
*H04W 52/24* (2009.01)
*H04W 72/08* (2009.01)
*H04W 84/04* (2009.01)

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,151,492 A | 11/2000 | Melin |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi |
| 8,228,827 B2 | 7/2012 | Jeong et al. |
| 8,363,697 B2 | 1/2013 | Grob et al. |
| 8,446,869 B2 | 5/2013 | Lee et al. |
| 2003/0043928 A1 | 3/2003 | Ling et al. |
| 2005/0064873 A1 | 3/2005 | Karaoguz et al. |
| 2005/0096061 A1 | 5/2005 | Ji et al. |
| 2005/0254555 A1* | 11/2005 | Teague .................. 375/136 |
| 2005/0260990 A1 | 11/2005 | Huang et al. |
| 2006/0098604 A1 | 5/2006 | Flammer et al. |
| 2006/0166693 A1 | 7/2006 | Jeong et al. |
| 2007/0064669 A1 | 3/2007 | Classon et al. |
| 2007/0087691 A1 | 4/2007 | Lee et al. |
| 2007/0104166 A1 | 5/2007 | Rahman et al. |
| 2007/0153719 A1 | 7/2007 | Gopal |
| 2007/0167181 A1 | 7/2007 | Ramesh et al. |
| 2007/0242763 A1* | 10/2007 | Li et al. .................. 375/260 |
| 2007/0253355 A1 | 11/2007 | Hande et al. |
| 2008/0008212 A1 | 1/2008 | Wang et al. |
| 2008/0013500 A1* | 1/2008 | Laroia et al. .................. 370/338 |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0219236 A1 | 9/2008 | Love et al. |
| 2008/0220791 A1 | 9/2008 | Cho et al. |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1 | 10/2008 | Periyalwar et al. |
| 2008/0260062 A1 | 10/2008 | Imamura |
| 2008/0268859 A1 | 10/2008 | Lee et al. |
| 2008/0285513 A1 | 11/2008 | Jung et al. |
| 2009/0046605 A1 | 2/2009 | Gao et al. |
| 2009/0046674 A1 | 2/2009 | Gao et al. |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1 | 8/2009 | Kawamura et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0298498 A1 | 12/2009 | Pisut et al. |
| 2009/0312024 A1* | 12/2009 | Chen et al. .................. 455/437 |
| 2009/0325626 A1 | 12/2009 | Palanki et al. |
| 2010/0008282 A1* | 1/2010 | Bhattad et al. .................. 370/312 |
| 2010/0022250 A1 | 1/2010 | Petrovic et al. |
| 2010/0029282 A1 | 2/2010 | Stamoulis et al. |
| 2010/0034135 A1 | 2/2010 | Kim et al. |
| 2010/0034158 A1 | 2/2010 | Meylan |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0128690 A1 | 5/2010 | McBeath et al. |
| 2010/0144317 A1 | 6/2010 | Jung et al. |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1 | 10/2010 | Wei et al. |
| 2010/0260156 A1 | 10/2010 | Lee et al. |
| 2010/0265870 A1 | 10/2010 | Cai et al. |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1 | 12/2010 | Choudhury |
| 2010/0331030 A1 | 12/2010 | Nory et al. |
| 2011/0007673 A1 | 1/2011 | Ahn et al. |
| 2011/0013554 A1 | 1/2011 | Koskinen |
| 2011/0032890 A1 | 2/2011 | Wu |
| 2011/0038271 A1 | 2/2011 | Shin et al. |
| 2011/0044227 A1 | 2/2011 | Harrang et al. |
| 2011/0044261 A1 | 2/2011 | Cai et al. |
| 2011/0051684 A1 | 3/2011 | Li et al. |
| 2011/0053603 A1 | 3/2011 | Luo et al. |
| 2011/0064037 A1 | 3/2011 | Wei et al. |
| 2011/0081865 A1 | 4/2011 | Xiao et al. |
| 2011/0116364 A1 | 5/2011 | Zhang et al. |
| 2011/0116437 A1 | 5/2011 | Chen et al. |
| 2011/0134875 A1 | 6/2011 | Ding et al. |
| 2011/0149771 A1 | 6/2011 | Abeta et al. |
| 2011/0149813 A1 | 6/2011 | Parkvall et al. |

(56) References Cited

U.S. PATENT DOCUMENTS

| | | |
|---|---|---|
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0194514 A1 | 8/2011 | Lee et al. |
| 2011/0199986 A1 | 8/2011 | Fong et al. |
| 2011/0201279 A1 | 8/2011 | Suzuki et al. |
| 2011/0205982 A1 | 8/2011 | Yoo et al. |
| 2011/0211503 A1 | 9/2011 | Che et al. |
| 2011/0243075 A1 | 10/2011 | Luo et al. |
| 2011/0249643 A1 | 10/2011 | Barbieri et al. |
| 2011/0268032 A1 | 11/2011 | Kim et al. |
| 2011/0274066 A1 | 11/2011 | Tee et al. |
| 2011/0275394 A1 | 11/2011 | Song et al. |
| 2011/0310789 A1 | 12/2011 | Hu et al. |
| 2011/0310830 A1 | 12/2011 | Wu et al. |
| 2011/0317624 A1 | 12/2011 | Luo et al. |
| 2012/0026892 A1 | 2/2012 | Nakao et al. |
| 2012/0033588 A1 | 2/2012 | Chung et al. |
| 2012/0033627 A1 | 2/2012 | Li et al. |
| 2012/0033647 A1 | 2/2012 | Moon et al. |
| 2012/0039180 A1 | 2/2012 | Kim et al. |
| 2012/0039208 A1 | 2/2012 | Aydin |
| 2012/0087250 A1 | 4/2012 | Song et al. |
| 2012/0088516 A1 | 4/2012 | Ji et al. |
| 2012/0093095 A1 | 4/2012 | Barbieri et al. |
| 2012/0093097 A1 | 4/2012 | Che et al. |
| 2012/0106481 A1 | 5/2012 | Cho et al. |
| 2012/0108239 A1 | 5/2012 | Damnjanovic et al. |
| 2012/0108255 A1 | 5/2012 | Jo et al. |
| 2012/0155366 A1 | 6/2012 | Zirwas et al. |
| 2012/0182958 A1 | 7/2012 | Pelletier et al. |
| 2012/0212260 A1 | 8/2012 | Chen et al. |
| 2012/0236798 A1 | 9/2012 | Raaf et al. |
| 2012/0281656 A1 | 11/2012 | Hooli et al. |
| 2013/0005344 A1 | 1/2013 | Dimou et al. |
| 2013/0077543 A1 | 3/2013 | Kim et al. |
| 2013/0077576 A1 | 3/2013 | Abe et al. |
| 2013/0229933 A1 | 9/2013 | Ji et al. |
| 2013/0250927 A1 | 9/2013 | Song |
| 2014/0036838 A1 | 2/2014 | Yoo et al. |
| 2014/0146798 A1 | 5/2014 | Damnjanovic et al. |

FOREIGN PATENT DOCUMENTS

| | | |
|---|---|---|
| CN | 101090281 A | 12/2007 |
| CN | 101155399 A | 4/2008 |
| CN | 101262680 A | 9/2008 |
| CN | 101316267 A | 12/2008 |
| CN | 101400130 A | 4/2009 |
| CN | 101483511 A | 7/2009 |
| CN | 101499882 A | 8/2009 |
| CN | 101505498 A | 8/2009 |
| CN | 101686580 A | 3/2010 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 A | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2011521512 | 7/2011 |
| JP | 2013502841 A | 1/2013 |
| KR | 20100018453 A | 2/2010 |
| RU | 2305902 C2 | 9/2007 |
| RU | 2007105748 A | 8/2008 |
| RU | 2369965 C2 | 10/2009 |
| WO | WO-0111804 A1 | 2/2001 |
| WO | WO-2004066104 | 8/2004 |
| WO | 2004079949 A1 | 9/2004 |
| WO | WO-2005019705 A1 | 3/2005 |
| WO | WO-2005062798 A2 | 7/2005 |
| WO | WO-2005071867 | 8/2005 |
| WO | WO2005109705 | 11/2005 |
| WO | WO-2005125053 A1 | 12/2005 |
| WO | WO-2006020021 A1 | 2/2006 |
| WO | 2006099546 A1 | 9/2006 |
| WO | WO-2007080892 A1 | 7/2007 |
| WO | WO2007097671 A1 | 8/2007 |
| WO | WO-2007097672 A1 | 8/2007 |
| WO | WO2007108630 A1 | 9/2007 |
| WO | WO-2007129537 A1 | 11/2007 |
| WO | WO-2007129620 A1 | 11/2007 |
| WO | 2008024751 A2 | 2/2008 |
| WO | WO-2008040448 A1 | 4/2008 |
| WO | WO-2008041819 A2 | 4/2008 |
| WO | WO-2008081816 A1 | 7/2008 |
| WO | WO-2008093985 A1 | 8/2008 |
| WO | 2008116128 A2 | 9/2008 |
| WO | WO-2009011059 A1 | 1/2009 |
| WO | 2009020926 A1 | 2/2009 |
| WO | WO2009016260 A1 | 2/2009 |
| WO | WO2009022295 | 2/2009 |
| WO | WO2009038367 | 3/2009 |
| WO | 2009048246 A2 | 4/2009 |
| WO | WO-2009043002 | 4/2009 |
| WO | WO2009062115 | 5/2009 |
| WO | WO2009064147 A2 | 5/2009 |
| WO | WO2009065075 A1 | 5/2009 |
| WO | 2009067842 A1 | 6/2009 |
| WO | WO-2009071583 A1 | 6/2009 |
| WO | WO-2009076803 A1 | 6/2009 |
| WO | WO2009078795 A1 | 6/2009 |
| WO | WO2009088251 A2 | 7/2009 |
| WO | WO-2009089798 A1 | 7/2009 |
| WO | WO-2009096846 A1 | 8/2009 |
| WO | WO-2009126586 | 10/2009 |
| WO | WO2009152866 A1 | 12/2009 |
| WO | WO-2010006285 | 1/2010 |
| WO | WO-2010016607 A1 | 2/2010 |
| WO | WO2010016726 A2 | 2/2010 |
| WO | 2010032791 A1 | 3/2010 |
| WO | WO2010033957 A2 | 3/2010 |
| WO | WO-2010039738 | 4/2010 |
| WO | WO-2010044903 A2 | 4/2010 |
| WO | WO-2010110840 A2 | 9/2010 |
| WO | WO2011034966 A1 | 3/2011 |

OTHER PUBLICATIONS

3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009, pp. 1-17, XP050377589.

3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, no. San Francisco, USA; May 9, 2009, pp. 1-34, XP050339706, [retrieved on May 9, 2009].

(56) References Cited

OTHER PUBLICATIONS

3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf0/36321.htm> [retrieved on Oct. 21, 2009] Sections 5.1.1 to 5.1.6.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP Standard; 3GPP TS 36.300, 3rd Generation Partnership Project (3GPP), Mobile Competence Centre; 650, Route Des Lucioles; F-06921 Sophia-Antipolis Cedex; France, No. V8.8.0, Mar. 1, 2009, pp. 1-157, XP050377583, p. 45, line 3-p. 50, line 15.
Ericsson: 3GPP Draft; R3-083577, 3rd Generation Partnership Project (3GPP), Mobile Competence Centre ; 650, Route Des Lucioles ; F-06921 Sophia-Antipolis Cedex ; France, no. Prague, Czech Republic; Nov. 25, 2008, XP050324756 [retrieved on Nov. 25, 2008] Section 10.1.5.1.
Ericsson: "Simultaneous reception of transport channels in the LTE", 3GPP Draft; 36302_CR0009_(REL-8) R2-093578, 3rd Generation Partnership Project (3GPP), Mobile Competence Centre ; 650, Route Des Lucioles ; F-06921 Sophia-Antipolis Cedex ; France, no. San Francisco, USA; May 9, 2009, pp. 1-3, XP050340488, [retrieved on May 9, 2009].
Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, no. Athens, Greece, 20090206, Feb. 6, 2009, XP050318788.
Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL1/TSGR1_61/Docs/ [retrieved on Sep. 30, 2011].
Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351434 [retrieved on Aug. 18, 2009] p. 1, paragraph 1.
International Search Report and Written Opinion—PCT/US2010/045196, International Search Authority—European Patent Office—Mar. 25, 2011.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre ; 650, Route Des Lucioles ; F-06921 Sophia-Antipolis Cedex ; France, no. Prague, Czech Republic; Sep. 23, 2008, XP050320136, [retrieved on Sep. 23, 2008] the whole document.
Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, XP050388168, [retrieved on Aug. 22, 2009].
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; F-06921 Sophia-Antipolis Cedex ; France, no. Shenzhen, China; Aug. 18, 2009, XP050351718 [retrieved on Aug. 18, 2009] p. 1, paragraph 1-paragraph 2.
Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; May 8, 2009, XP050339658, [retrieved on May 8, 2009].
Qualcomm Inc., "Introduction of time domain ICIC", R2-106943, 3GPP TSG-RAN WG2 Meeting #72, Jacksonville, US, Nov. 15-19, 2010, pp. 4.
Qualcomm Inc., "RRM/RLM resource restriction for time domain ICIC", R2-110698, 3GPP TSG-RAN WG2 Meeting #72-bis, Dublin, Ireland, Jan. 17-21, 2011, pp. 8.
Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre; 650, Route Des Lucioles ; F-06921 Sophia-Antipolis Cedex ; France, vol. RAN WG1, no. San Francisco, USA; Feb. 22, 2010, Feb. 16, 2010, XP050418951, [retrieved on Feb. 16, 2010].
Samsung: "Clarification on the parallel receptions for PDSCHs", 3GPP Draft; 36302_CR0010 (Rel-8) R2-093579, 3rd Generation Partnership Project (3GPP), Mobile Competence Centre ; 650, Route Des Lucioles ; F-06921 Sophia-Antipolis Cedex ; France, no. San Francisco, USA; May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351683 [retrieved on Aug. 19, 2009] p. 1, paragraph 1.
Samsung: "Inbound mobility to H(e)NBs" 3GPP Draft; R2-093250_ Inbound Mobility to H(E)NBS-R4, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, XP050340933 [retrieved on Apr. 28, 2009] the whole document.
Vice Chairman: "Report of E-UTRA control plane session" 3GPP Draft; R2-082841—Chair-Report-RAN2-62-LTE-CP, 3rd Generation Partnership Project (3GPP), Mobile Competence Centre ; 650, Route Des Lucioles ; F-06921 Sophia-Antipolis Cedex ; France, vol. RAN WG2, no. Kansas City, USA; May 14, 2008, XP050140403 [retrieved on May 14, 2008].
Written Opinion—PCT/US2011/041643, ISA/EPO—Oct. 18, 2011.
Young Jin Sang, et al., "A Self-Organized Femtocell for IEEE 802.16e System", Global Telecommunications Conference, 2009. Globecom 2009. IEEE, IEEE, Piscataway, NJ, USA, Nov. 30, 2009, pp. 1-5, XP031646102, ISBN: 978-1-4244-4148-8.
3GPP TS 36.355 V9.0.0, Technical Specification Group Radio Access Network, E-UTRA, "LTE Positioning Protocal (LLP) (Release 9)" Dec. 2009, 31 pages.
Alcatel-Lucent, "Interference Coordination Framework with Results", 3GPP TSG RAN WG1 Meeting #49bis, R1-07-3187, Jun. 29, 2007, pp. 1-9.
Huawei, "Consideration on CSI-RS design for CoMP and text proposal to 36.814", 3GPP TSG-RAN WG1#57b R1-092364, Los Angeles, USA, Jun. 29-Jul. 3, 2009.
LG Electronics: "Coordination for DL control channel in co-channel HeNB deployment", 3GPP Draft; R1-102429 Control Channel in Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 6, 2010, XP050419640, [retrieved on Apr. 6, 2010].
NTT Docomo: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 7, 2010, XP050419698, [retrieved on Apr. 7, 2010].
NTT Docomo, "Performance Evaluations of Heterogeneous Networks", 3GPP TSG RAN WG1 Meeting #60, R1-101226, Feb. 26, 2010, pp. 1-18.
Qualcomm Europe: "Coordinated Multi-Point downlink transmission in LTE-Advanced" 3GPP Draft; R1-084400 Comp, 3rd Generation Partnership Project (3GPP), Mobile Competence Centre; 650, Route Des Lucioles ; F-06921 Sophia-Antipolis Cedex; France, no. Prague, Czech Republic; Nov. 5, 2008, XP050317663.

(56) References Cited

OTHER PUBLICATIONS

Taiwan Search Report—TW100112865—TIPO—Jan. 3, 2014.
3GPP TS 36.331 V8.5.0, Radio Resource Control (RRC); Protocol specification (Release 8), 204 pages, 2009.
Bell A L et al., "Multi-cell cooperative RS in CoMP", 3GPP Draft; R1-092317, 3rd Generation Partnership Project (3GPP), Mobile Competence Centre; 650, Route Des Lucioles; F-06921 Sophia-Antipolis Cedex; France, no. Los Angeles, USA; Jun. 24, 2009, XP050350848, [retrieved on Jun. 24, 2009].
Ericsson: "Structure of System Information", TSGR2#4(99)414, 5 pages, May 1999.
European Search Report—EP12183843—Search Authority—Hague—Feb. 8, 2013.
Gale et al., "Distributed discreate resource optimization in Heterogeneous networks". 2008, pp. 560-564, IEEE 04641670.
Garcia F., et al.,"Design of a slew rate controlled output buffer", ASIC Conference 1998. Proceedings. Eleventh Annual IEEE International Rochester, NY, USA Sep. 13-16, 1998, New York, NY, USA.IEEE, US, Sep. 13, 1998, pp. 147-150, XP010309693, DOI: 10.1109/ASIC.1998.722821 ISBN: 978-0-7803-4980-3.
Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, vol. RAN WGl, no. San Francisco, USA; Feb. 22, 2010, Feb. 16, 2010, XP050418632, [retrieved on Feb. 16, 2010].
Huawei: "Discussion on OTDOA based positioning issue", 3GPP Draft; R1-092355, 3rd Generation Partnership Project (3GPP), Mobile Competence Centre; 650, Route Des Lucioles; F-06921 Sophia-Antipolis Cedex; France, no. Los Angeles, USA, Jun. 24, 2009, XP050350879, [retrieved on Jun. 24, 2009].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGi, no. Beijing, china; Apr. 12, 2010, Apr. 6, 2010, XP050419318, [retrieved on Apr. 6, 2010].
Inoue et al., "Space time transmit site diversity for OFDM multi base station system", 2002, pp. 30-34, IEEE 01045691.
Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.
Taiwan Search Report—TW099126793—TIPO—May 24, 2013.
3GPP: "LS on RV Determination for BCCH," 3GPP TSG RAN WG1 Meeting #54bis, Sep. 29, 2008, R1-084067, <URL: http://www.3gpp.org/ftp/tsg_ran/WG1_RL1/TSGR1_54b/Docs/R1-084067.zip>.
3GPP TSG-RAN WG2 Meeting #68 R2-096531, "Email discussion on MBMS value range [67b#14]", Nov. 9-13, 2009, Jeju, Korea, Discussion and Decision, <URL: http://www.3gpp.org/ftp/tsg_ran/WG2_RL2/TSGR2_68/Docs/R2-096531.zip>, p. No. 1-13.
Catt,Addition of MBSFN information on X2 interface,[online],3GPPTSG-RAN3 Meeting #64,May 4, 2009,R3-091247, Internet<URL:http://www.3gpp.org/ftp/tsg_ran/WG3_lu/TSGR3_64/Docs/R3-091247.zip>, p. No. 1-14.
Motorola: "DCI Format 1C with implicit RV and TBS," 3GPP TSG RAN1 #54, Aug. 18, 2008, R1-083207, 5 pages, <URL: http://www.3gpp.org/ftp/tsg_ran/WG1_RL1/TSGR1_54/Docs/R1-083207.zip>.
3GPP TS 36.355 V9.0.0, LTE Positioning Protocol (LPP), Dec. 2009, http://www.3gpp.org/ftp/Specs/archive/36_series/36.355/36355-900.zip 3GPP TSG RAN WG2 #62bis, Ericsson, E-UTRA UE Radio Measurement Reporting for Uplink ICIC, R2-083147, Jul. 2008, http://www.3gpp.org/FTP/tsg_ran/WG2_RL2/TSGR2_62bis/Docs/R2-083147.zip.
LG Electronics: "Considerations on interference coordination in heterogeneous networks", 3GPP Draft ; R1-101369, 3rd Generation Partnership Project (3GPP), Mobile Competence Centre; 650, Route Des Lucioles ; F-06921 Sophia-Antipolis Cedex ; France, vol. RAN WGI, no. San Francisco, USA; Feb. 22, 2010-Feb. 26, 2010, Feb. 16, 2010, XP050418854, pp. 1-5.
LG-Nortel: "Interference under Type 1 RN", 3GPP TSG-RAN WG1#57, R1-092184, 14 pages, May 4, 2009.
NTT Docomo: "Downlink Interference Coordination Between eNodeB and Home eNodeB", 36PP Draft; R1-101225 HENB_ICIC, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010, XP050418740, [retrieved on Feb. 16, 2010]., p. 1-8.
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route Des Lucioles, F-06921 Sophia-Antipolis Cedex, France, no. Ljubljana, Jan. 7, 2009, XP050318205, pp. 1-5, [retrieved on Jan. 7, 2009].
Gaie C., et al., "Distributed Discrete Resource Optimization in Heterogeneous Networks," IEEE, 2008, pp. 560-564.
Interdigital Communications: "eICIC Macro-Femto: Time-domain muting and ABS", 3GPP TSG-RAN WG1#63, R1-105951, Nov. 15, 2010, 6 Pages, URL: http://www.3gpp.org/ftp/tsg_ran/WG1_RL1/TSGR1_63/Docs/R1-105951.zip.
Lopez-Perez D., et al., "OFDMA femtocells: A roadmap on interference avoidance", IEEE Communications Magazine, IEEE Service Center, Piscataway, US, vol. 46, No. 9, Sep. 1, 2009, pp. 41-48, XP011283364, ISSN: 0163-6804, DOI: 10.1109/MCOM.2009.5277454.
Motorola: "HeNB Interference Management", 3GPP TSG-RAN WG1#60 R1-101121, <URL:http://www.3gpp.org/ftp/tsp_ran/WG1_RL1/TSGR1_60/Docs/R1-101121.zip>, Feb. 17, 2010, 4 Pages.
Nortel: "Discussions on LTE mobility performance evaluation", 3GPP TSG-RAN WG1#57 R1-091913, <URL:http://www.3gpp.org/ftp/tsg_ran/WG1_RL1/TSGR1_57/Docs/R1-091913.zip>, May 9, 2009, 3 Pages.
Qualcomm Incorporated: "Measurements and feedback extensions for improved operations in HetNets", 3GPP TSG-RAN WG1#60b R1-102353, <URL:http://www.3gpp.org/ftp/tsg_ran/WG1_RL1/TSGR1_60b/Docs.R1-102353.zip>, Apr. 6, 2010, 3 Pages.
TSG-RAN WG4: "Reply to LS on mobility evaluation" 3GPP TSG-RAN WG4‡50bis R4-091518, <URL:http://www.3gpp.org/ftp/tsg_ran/WG4_Radio/TSGR4_50bis/Documents/R4-091518.zip>, Mar. 30, 2009, 3 Pages.
ZTE: "Scenarios and Specification Impact of Type 2 Relay", 3GPP TSG-RAN WG1#60 R1-100979, <URL:http://www.3gpp.org/ftp/tsg_ran/WG1_RL1/TSGR1_60/Docs/R1-100979.zip>, Feb. 16, 2010, 7 Pages.
Ericsson: Considerations on Non-CA based Heterogeneous Deployments, 3GPP TSG-RAN WG1 #61, R1-102618, ST-Ericsson, 2010, 3 Pages.
LG Electronics: Coordination for DL Control Channel in Co-Channel CSG Deployment, 3GPP TSG RAN WG1 Meeting #61, R1-102704, 2010, 8 Pages.
Huawei et al., "The possible restrictions on the configuration of almost blank subframes in Macro-Pico deployments", 3GPP Draft; R1-105150 The Possible Restrictions on the Configuration of Almost Blank Subframes in Macro-PI Co Deployments_vol. 5, 3rd Generation Partnership Project (3GPP), Mobile Competence Centre; 650, Route Des Lucioles; F-06921 Sophia-Antipolis CE, vol. RAN WG1, Oct. 5, 2010, XP050450368, pp. 1-5.

* cited by examiner

INTERFERENCE MITIGATION BY PUNCTURING TRANSMISSION OF INTERFERING CELLS

CROSS-REFERENCE TO RELATED APPLICATIONS

This application claims the benefit of U.S. Provisional Patent Application Ser. No. 61/233,107 entitled "INTERFERENCE MITIGATION BY PUNCTURING TRANSMISSION OF INTERFERING CELLS" which was filed Aug. 11, 2009. The entirety of the aforementioned application is herein incorporated by reference.

BACKGROUND

I. Field

The following description relates generally to wireless communications, and more particularly to mitigating interference for a Physical Broadcast Channel (PBCH) by puncturing a transmission of an interfering cell in a wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

Heterogeneous wireless communication systems (e.g., heterogeneous networks (HetNets), . . . ) commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to UEs using a wireless technology (e.g., 3GPP Universal Mobile Telecommunications System (UMTS) or Long Term Evolution (LTE), 1× Evolution-Data Optimized (1×EV-DO), . . . ) to communicate with the UEs and an existing broadband Internet connection (e.g., digital subscriber line (DSL), cable, . . . ) for backhaul. A femto cell base station can also be referred to as a Home Evolved Node B (HeNB), a Home Node B (HNB), a femto cell, or the like. Examples of other types of base stations include pico cell base stations, micro cell base stations, and so forth.

In a heterogeneous network, a cell can potentially cause significant interference to a neighboring cell. For instance, a UE can attempt to access a macro cell base station, but the UE can be located closer to a femto cell base station or a pico cell base station. By way of example, the UE may be unable to access the femto cell base station if the femto cell base station has restricted association. Thus, the femto cell base station can be a strong interferer to the macro cell base station. Pursuant to another example, the pico cell base station can impose significant interference to the macro cell base station when implementing range extension.

Interference from a neighboring cell in a heterogeneous network can detrimentally impact distribution of system information. More particularly, a Master Information Block (MIB) can include a limited number of parameters that can be used by a UE for initial access to a cell. The MIB can be carried on a Physical Broadcast Channel (PBCH). The PBCH conveys time-critical information which is essential for decoding control and data channels. Further, in a synchronous system, PBCH signals from neighboring cells can collide with each other since the PBCH signals from the neighboring cells are typically sent at a common time on a common set of resource elements. Conventional techniques for sending and decoding the PBCH signals are oftentimes detrimentally impacted in a strong interference environment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating control of interference in a heterogeneous wireless communication environment. A Physical Broadcast Channel (PBCH) transmission from an interfering base station can be punctured based upon a puncturing pattern as a function of a cell identifier (ID) and a transmit time. Puncturing can be effectuated by applying power control. Thus, a punctured symbol or subframe can have a reduced transmit power or a transmit power set to zero. Further, the puncturing pattern can be defined on a subframe basis or on a symbol basis.

According to related aspects, a method that facilitates controlling interference in a heterogeneous wireless communication environment is described herein. The method can include determining a transmit power for a transmission symbol from a puncturing pattern as a function of a cell identifier (ID) and a transmit time. Moreover, the method can include sending the transmission symbol at the transmit power.

Another aspect relates to a wireless communications apparatus. The wireless communications apparatus can include a memory that retains instructions related to determining a transmit power for a transmission symbol from a puncturing pattern as a function of a cell identifier (ID) and a transmit time, and broadcasting the transmission symbol at the transmit power. Further, the wireless communications apparatus can include a processor, coupled to the memory, configured to execute the instructions retained in the memory.

Yet another aspect relates to a wireless communications apparatus that enables managing interference in a heterogeneous wireless communication environment. The wireless communications apparatus can include means for determining a transmit power for a transmission symbol from a puncturing pattern as a function of a cell identifier (ID) and a transmit time. Further, the wireless communications apparatus can include means for sending the transmission symbol at the transmit power.

Still another aspect relates to a computer program product that can comprise a computer-readable medium. The computer-readable medium can include code for determining a transmit power for a transmission symbol from a puncturing pattern as a function of a cell identifier (ID) and a transmit time. Moreover, the computer-readable medium can include code for sending the transmission symbol at the transmit power.

In accordance with another aspect, a wireless communications apparatus can include a processor, wherein the processor can be configured to determine a transmit power for a transmission symbol from a puncturing pattern as a function of a cell identifier (ID) and a transmit time. Further, the processor can be configured to send the transmission symbol at the transmit power.

According to other aspects, a method that facilitates detecting system information in a heterogeneous wireless communication environment is described herein. The method can include identifying at least one punctured transmission symbol sent by a base station from a puncturing pattern as a function of a cell identifier (ID) and a transmit time. Moreover, the method can include decoding system information from the base station by ignoring log likelihood ratios (LLRs) from the at least one punctured transmission symbol.

Another aspect relates to a wireless communications apparatus. The wireless communications apparatus can include a memory that retains instructions related to identifying at least one punctured transmission symbol sent by a base station from a puncturing pattern as a function of a cell identifier (ID) and a transmit time, and decoding system information from the base station by ignoring log likelihood ratios (LLRs) from the at least one punctured transmission symbol. Further, the wireless communications apparatus can include a processor, coupled to the memory, configured to execute the instructions retained in the memory.

Yet another aspect relates to a wireless communications apparatus that enables obtaining system information in a wireless communication environment. The wireless communications apparatus can include means for identifying at least one punctured transmission symbol sent by a base station from a puncturing pattern as a function of a cell identifier (ID) and a transmit time. Further, the wireless communications apparatus can include means for decoding system information from the base station by ignoring log likelihood ratios (LLRs) from the at least one punctured transmission symbol.

Still another aspect relates to a computer program product that can comprise a computer-readable medium. The computer-readable medium can include code for recognizing at least one punctured transmission symbol sent by a base station from a puncturing pattern as a function of a cell identifier (ID) and a transmit time. Moreover, the computer-readable medium can include code for decoding system information from the base station by ignoring log likelihood ratios (LLRs) from the at least one punctured transmission symbol.

In accordance with another aspect, a wireless communications apparatus can include a processor, wherein the processor can be configured to identify at least one punctured transmission symbol sent by a base station from a puncturing pattern as a function of a cell identifier (ID) and a transmit time. Further, the processor can be configured to decode system information from the base station by ignoring log likelihood ratios (LLRs) from the at least one punctured transmission symbol.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
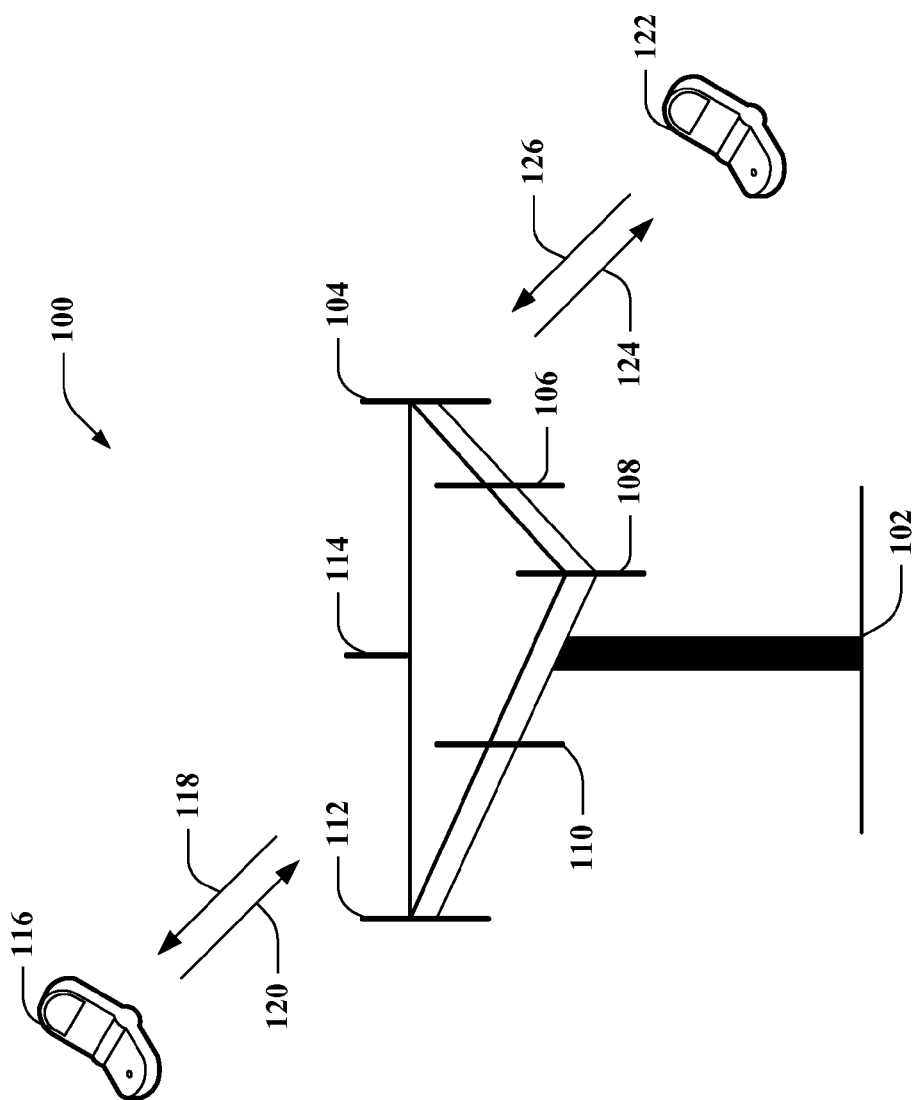
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates via an over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules etc. discussed in connection with the figures need not be included. A combination of these approaches can also be used.

FIG. 1 illustrates a system 100 in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

System 100 can be part of a heterogeneous network. Further, it is contemplated that base station 102 can be any type of base station (e.g., macro cell base station, micro cell base station, pico cell base station, femto cell base station, . . . ). Moreover, any type(s) of disparate base station(s) (not shown) can be within proximity of base station 102.

According to an example, base station 102 can be an interfering base station. Following this example, a transmission by base station 102 can interfere with a transmission by a disparate base station located nearby base station 102. For instance, if base station 102 is a femto cell base station or a pico cell base station, then base station 102 can be an interfering base station, which can interfere with a nearby macro cell base station; however, it is to be appreciated that the claimed subject matter is not so limited.

By way of another example, base station 102 can be an interfered base station. Hence, a transmission by a disparate base station (e.g., interfering base station, femto cell base station, pico cell base station, . . . ) (not shown) positioned nearby base station 102 can interfere with a transmission by base station 102. For instance, if base station 102 is a macro cell base station, then base station 102 can be an interfered base station; yet, it is contemplated that the claimed subject matter is not so limited.

Since significant interference can be encountered in a heterogeneous network, system 100 can support making decoding of a Physical Broadcast Channel (PBCH) robust to such interference. In an interference-limited environment, system 100 can enhance PBCH decoding via employing puncturing. In particular, a transmission by a strong neighbor cell (e.g., interfering base station, . . . ) can be punctured when a weak cell (e.g., interfered base station, . . . ) is transmitting a PBCH signal. Such puncturing of the transmission by the strong neighbor cell can be beneficial to PBCH decoding of UE(s) (e.g., UE 116, UE 122, . . . ) in the weak cell. Without limitation or loss of generality, as used herein, the terms "puncture," "puncturing," and the like can, for example, mean decrease a transmit power or use zero power to inhibit transmission.

Figure 2:
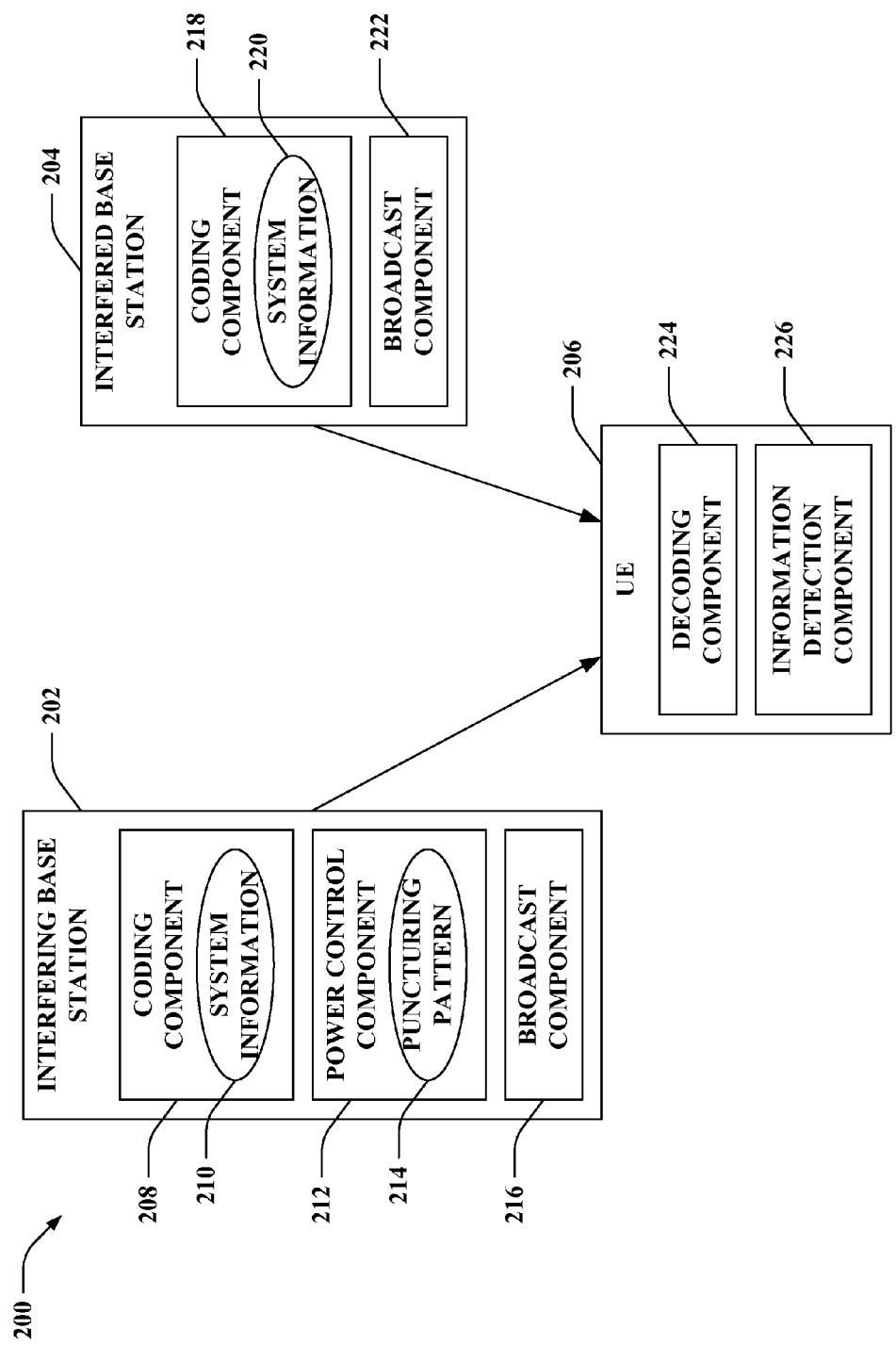
FIG. 2 is an illustration of an example system that controls interference in a heterogeneous wireless communication environment.

FIG. 2 illustrates a system 200 that controls interference in a heterogeneous wireless communication environment. System 200 includes an interfering base station 202 that can transmit and/or receive information, signals, data, instructions, commands, bits, symbols, and the like. System 200 also includes an interfered base station 204 that can transmit and/or receive information, signals, data, instructions, commands, bits, symbols, and the like. According to an example, interfered base station 204 can serve a UE 206; yet, it is to be appreciated that the claimed subject matter is not so limited (e.g., interfering base station 202 can serve UE 206, . . . ). Following the example where interfered base station 204 serves UE 206, interfered base station 204 can communicate with UE 206 via the forward link and/or reverse link. UE 206 can transmit and/or receive information, signals, data, instructions, commands, bits, symbols, and the like. Moreover, although not shown, it is contemplated that any number of base stations similar to interfering base station 202 and/or interfered base station 204 can be included in system 200 and/or any number of UEs similar to UE 206 can be included in system 200.

Interfering base station 202 and interfered base station 204 can be located near each other. A transmission by interfering base station 202 can interfere with a transmission by interfered base station 204. For example, a PBCH signal sent by interfering base station 202 can collide with a PBCH signal sent by interfered base station 204. If UE 206 is unable to access interfering base station 202 and the PBCH signal sent by interfering base station 202 is interfering with the PBCH signal sent by interfered base station 204, then UE 206 may be unable to decode the PBCH. Since the PBCH conveys time-critical information (e.g., Master Information Block (MIB), . . . ) used for decoding control and data channels, strong PBCH interference can detrimentally impact initial access to interfered base station 204 by UE 206.

According to an example, interfering base station 202 can be a femto cell base station or a pico cell base station, and interfered base station 204 can be a macro cell base station; however, it is to be appreciated that the claimed subject matter is not so limited. UE 206, for instance, can be nearby interfering base station 202 (e.g., femto cell base station, pico cell base station, . . . ). However, UE 206 can be unable to access interfering base station 202. Accordingly, interfering base station 202 can interfere with interfered base station 204.

By way of example, when UE 206 enters system 200, it can recognize interfering base station 202 as being associated with a strongest cell. UE 206 can be unaware of whether interfering base station 202 is a macro cell base station, pico cell base station, femto cell base station, or the like. UE 206 can attempt to access interfering base station 202 by evaluating a received PBCH signal from interfering base station 202. Yet, upon reading the PBCH signal from interfering base station 202, UE 206 can realize that UE 206 is barred from accessing interfering base station 202. For instance, UE 206 can be unable to access interfering base station 202 due to interfering base station 202 having restricted association as recognized from the PBCH signal; however, the claimed subject matter is not so limited. Accordingly, UE 206 can attempt to find another cell to access. When trying to find another cell (e.g., associated with interfered base station 204, . . . ), the PBCH signal from interfering base station 202 can interfere with a PBCH signal from interfered base station 204, thereby impacting an ability of UE 206 to receive, decode, and analyze the PBCH signal from interfered base station 204. However, in system 200, transmission by interfering base station 202 can be punctured as a function of cell identifier (ID) and transmit time to enable UE 206 to decode the PBCH signal from interfered base station 204. Accordingly, interference coming from interfering base station 202 (e.g., femto cell base station, pico cell base station, . . . ) can be reduced to allow UE 206 to read the PBCH signal sent by interfered base station 204 (e.g., macro cell base station, . . . ).

Interfering base station 202 can include a coding component 208 that encodes system information 210. System information 210 encoded by coding component 208 can be a MIB for interfering base station 202, and can include parameters used for initial access to interfering base station 202. For instance, system information 210 (e.g., the parameters included in the MIB, . . . ) can include downlink system bandwidth, Physical Hybrid Automatic Repeat Request (HARQ) Indicator Channel (PHICH) structure, and the most-significant eight bits of a System Frame Number; however, the claimed subject matter is not so limited. Coding component 208 can be a convolution coder, which can use a code rate of ⅓, after which a high degree of repetition of systematic bits and parity bits can be used. Hence, the MIB can be coded by coding component 208 at a very low code-rate to provide strong error protection. Coded bits yielded by coding component 208 can be mapped to resource elements used for the PBCH.

As described in more detail herein, a transmission time interval (TTI) of the PBCH can be 40 ms. PBCH can use four orthogonal frequency division multiplexing (OFDM) symbols from a subframe in a radio frame (e.g., four OFDM symbols from subframe 0 of each radio frame, . . . ). Further, PBCH can use a center six resource blocks (RBs) (e.g., middle 1.08 MHz, center 72 subcarriers, . . . ).

Moreover, interfering base station 202 can include a power control component 212 that determines a transmit power for a transmission symbol such as a PBCH symbol from a puncturing pattern 214 as a function of a cell ID associated with interfering base station 202 and a transmit time. The cell ID, for instance, can be a femto cell ID, a macro cell ID, or the like. Accordingly, power control component 212 can alter a transmit power used by interfering base station 202. Applying power control to PBCH can achieve a puncturing effect in system 200. Puncturing pattern 214 can hop over time, for instance. Moreover, puncturing pattern 214 can be defined on a subframe basis or a symbol basis. Interfering base station 202 can also include a broadcast component 216 that sends the PBCH symbol at the transmit power determined by power control component 212.

Interfered base station 204 can include a coding component 218 that encodes system information 220. System information 220 encoded by coding component 218 can be a MIB for interfered base station 204, and can include parameters used for initial access to interfered base station 204. For instance, system information 220 (e.g., the parameters included in the MIB, . . . ) can include downlink system bandwidth, PHICH structure, and the most-significant eight bits of a System Frame Number; however, the claimed subject matter is not so limited. Coding component 218 can be substantially similar to coding component 208 of interfering base station 202, and can be a convolution coder, which can use a code rate of ⅓, after which a high degree of repetition of systematic bits and parity bits can be used. Hence, the MIB can be coded by coding component 218 at a very low code-rate to provide strong error protection. Coded bits yielded by coding component 218 can be mapped to resource elements used for the PBCH. Thus, the coded bits can be mapped to PBCH symbols. Moreover, interfered base station 204 can include a broadcast component 222 that sends the PBCH symbols.

According to an example, interfered base station 204 need not employ a puncturing pattern. Thus, power control component 212 can set a transmit power level for a PBCH symbol sent by broadcast component 216 from interfering base station 202 based upon puncturing pattern 214 (e.g., to puncture a PBCH transmission from interfering base station 202 from time to time, . . . ), while interfered base station 204 need not leverage a puncturing pattern (e.g., interfered base station 204 need not have a PBCH transmission punctured, . . . ). Hence, a PBCH transmission sent by broadcast component 222 from interfered base station 204 need not be punctured from time to time.

UE 206 can include a decoding component 224 and an information detection component 226. Decoding component 224 can decode received PBCH symbols. Further, information detection component 226 can analyze the decoded PBCH symbols to identify information carried thereby. For instance, information detection component 226 can recognize system information (e.g., MIB, . . . ) carried by the PBCH symbols. The system information can be utilized by UE 206 for initial access to a base station (e.g., interfering base station 202, interfered base station 204, ... ) corresponding to the PBCH symbols.

According to another example, UE 206 can be in a punctured cell (e.g., interfering base station 202 may be accessible by UE 206, ... ). Utilization of PBCH power control described herein to effectuate puncturing can result in decoding component 224 of UE 206 having a slightly longer decoding time. By way of illustration, UE 206 can be a legacy UE (e.g., release 8 UE, ... ). Following this illustration, puncturing described herein can be backward compatible and transparent to the legacy UE, which can be unaware of puncturing pattern 214 employed by interfering base station 202. For instance, if a symbol is completely punctured by power control component 212 such that its transmit power is zero, the legacy UE can receive noise, which can result in slightly longer decoding time for PBCH. Pursuant to another illustration, UE 206 can be an enhanced UE (e.g., Release 10 UE, ... ) that can know puncturing pattern 214 in advance of PBCH transmission by interfering base station 202. Hence, the enhanced UE can ignore log likelihood ratios (LLRs) from punctured preambles or symbols for better performance. For instance, the enhanced UE can know that a first OFDM symbol is punctured with a transmit power set to zero, and thus, decoding component 224 of the enhanced UE can ignore LLRs in the first symbol.

Figure 3:
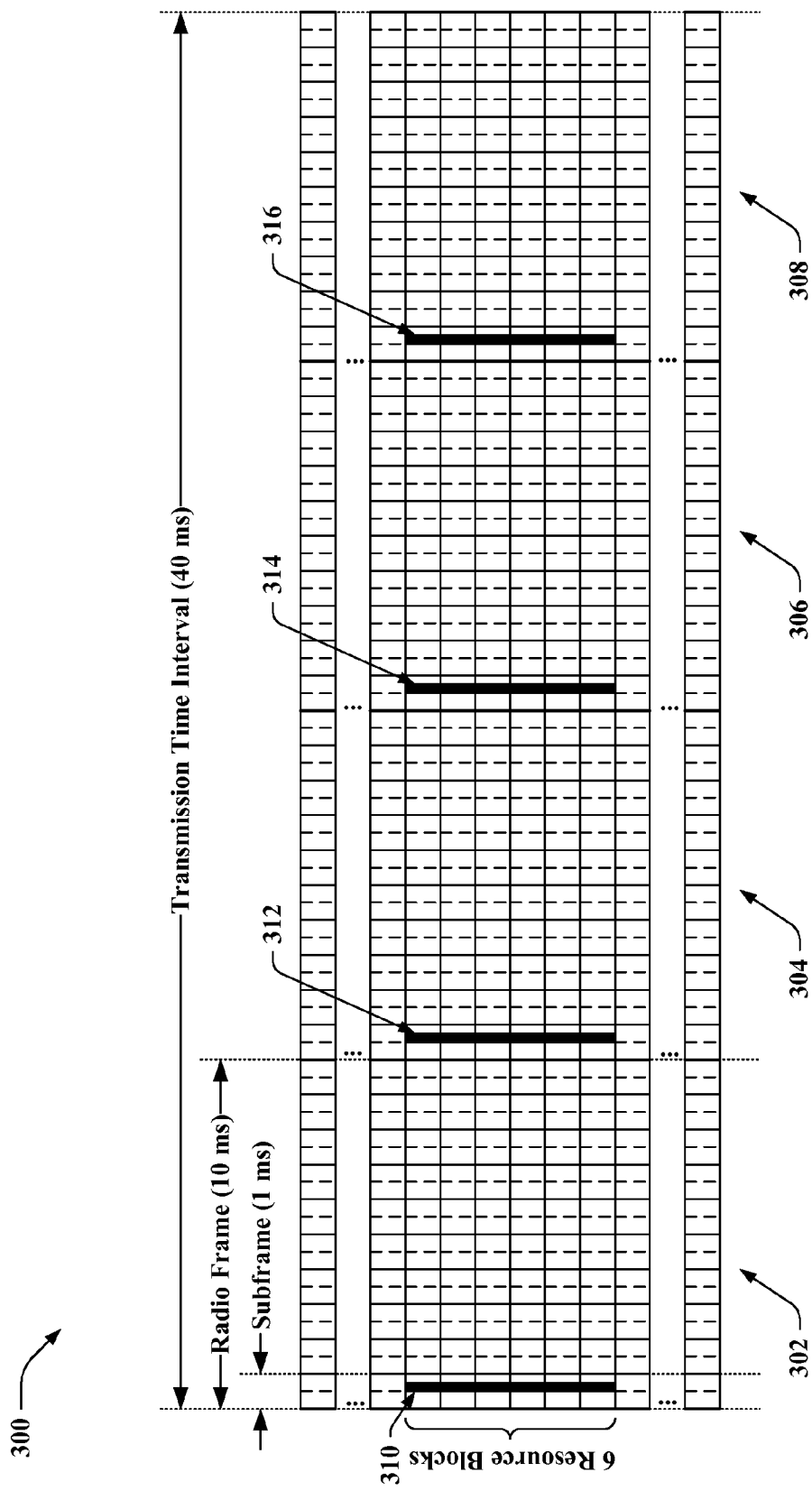
FIG. 3 is an illustration of an example structure of a transmission time interval (TTI) of PBCH in a wireless communication environment.

FIG. 3 illustrates an example structure 300 of a TTI of PBCH (e.g., PBCH TTI, PBCH frame, ... ) in a wireless communication environment. It is to be appreciated that structure 300 is provided for illustration purposes, and the claimed subject matter is not limited to such structure. In a synchronous system, PBCH signals from different base stations (e.g., interfering base station 202 of FIG. 2, interfered base station 204 of FIG. 2, different cells, ... ) can be sent at common times (e.g., common OFDM symbols, ... ) on a common set of subcarriers (e.g., central 72 subcarriers, ... ) as described below. Thus, the PBCH signals from the different base stations can collide.

PBCH has a 40 ms TTI. Structure 300 includes four consecutive radio frames, namely, radio frame 302, radio frame 304, radio frame 306, and radio frame 308; the four consecutive radio frames are included in the PBCH TTI. A radio frame (e.g., radio frame 302, radio frame 304, radio frame 306, radio frame 308, ... ) can have a duration of 10 ms. Moreover, a radio frame (e.g., radio frame 302, radio frame 304, radio frame 306, radio frame 308, ... ) can include ten subframes, where a subframe can have a duration of 1 ms.

PBCH can be transmitted in four bursts in the 40 ms TTI: burst 310, burst 312, burst 314, and burst 316. A PBCH burst (e.g., burst 310, burst 312, burst 314, burst 316, ... ) can utilize four OFDM symbols in a second slot of a first subframe of a radio frame. Thus, for instance, burst 310 can use OFDM symbols 0, 1, 2, and 3 of a second slot of subframe 0 from radio frame 302, burst 312 can use OFDM symbols 0, 1, 2, and 3 of a second slot of subframe 0 from radio frame 304, burst 314 can use OFDM symbols 0, 1, 2, and 3 of a second slot of subframe 0 from radio frame 306, and burst 316 can use OFDM symbols 0, 1, 2, and 3. The OFDM symbols used for burst 310, burst 312, burst 314, and burst 316 can be referred to as PBCH symbols. Accordingly, sixteen PBCH symbols can be included in one PBCH TTI.

Moreover, PBCH can be transmitted on a center six RBs. Accordingly, a central 72 subcarriers can be used for the PBCH, regardless of an actual system bandwidth. The center six RBs can correspond to a middle 1.08 MHz of an overall system bandwidth.

Figure 4:
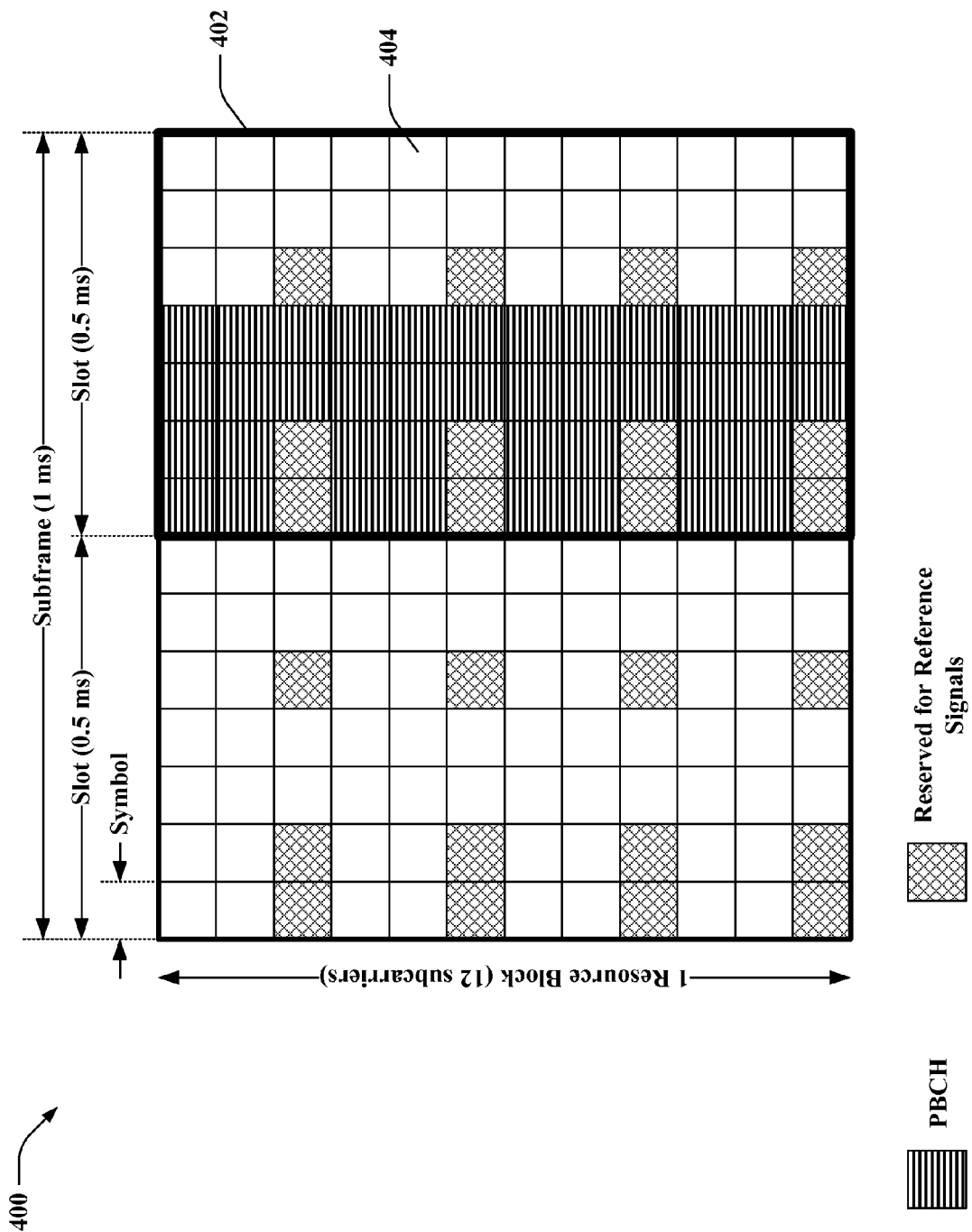
FIG. 4 is an illustration of an example subframe that can be leveraged in a wireless communication environment.

FIG. 4 illustrates an example subframe 400 that can be leveraged in a wireless communication environment. It can be appreciated that subframe 400 is provided as an example, and the claimed subject matter is not so limited.

Subframe 400 can have a duration of 1 ms, and can include two slots (e.g., each having a duration of 0.5 ms, ... ). In the depicted example, a slot of subframe 400 can include seven symbols in the case of normal CP length; thus, subframe 400 can include fourteen symbols. By way of another example, it is contemplated that a subframe (not shown) that employs extended CP can include two slots, each of which can include six symbols. It is to be appreciated, however, that the claimed subject matter is not limited to the foregoing examples.

In the frequency domain, resources of subframe 400 can be grouped in units of twelve subcarriers (e.g., 180 kHz, ... ). A unit of twelve subcarriers for a duration of one slot (e.g., 0.5 ms, ... ) can be referred to as a resource block (RB) (e.g., an example is RB 402, ... ). The smallest unit of resource can be referred to as a resource element (RE), which can be one subcarrier for a duration of one symbol (e.g., an example is RE 404 included in RB 402, ... ). An RB can include 84 REs for normal CP (or 72 REs for extended CP).

In the illustrated example, subframe 400 can be a first subframe (e.g., subframe 0, ... ) of a radio frame. For instance, subframe 400 can be a first subframe of radio frame 302, radio frame 304, radio frame 306, or radio frame 308 of FIG. 3. Moreover, a first four symbols of a second slot of subframe 400 can include REs used for PBCH, while a remainder of the REs from the first four symbols of the second slot of subframe 400 can be reserved for reference signals. It is to be appreciated, however, that the claimed subject matter is not limited to the depicted example pattern of REs reserved for reference signals.

Further, as set forth herein, a center six RBs can be used for PBCH transmission. Thus, RB 402 can be one of the center six RBs. The other five RBs from the center six RBs can be substantially similar to RB 402. Accordingly, RB 402 can include twelve of the central 72 subcarriers.

Figure 5:
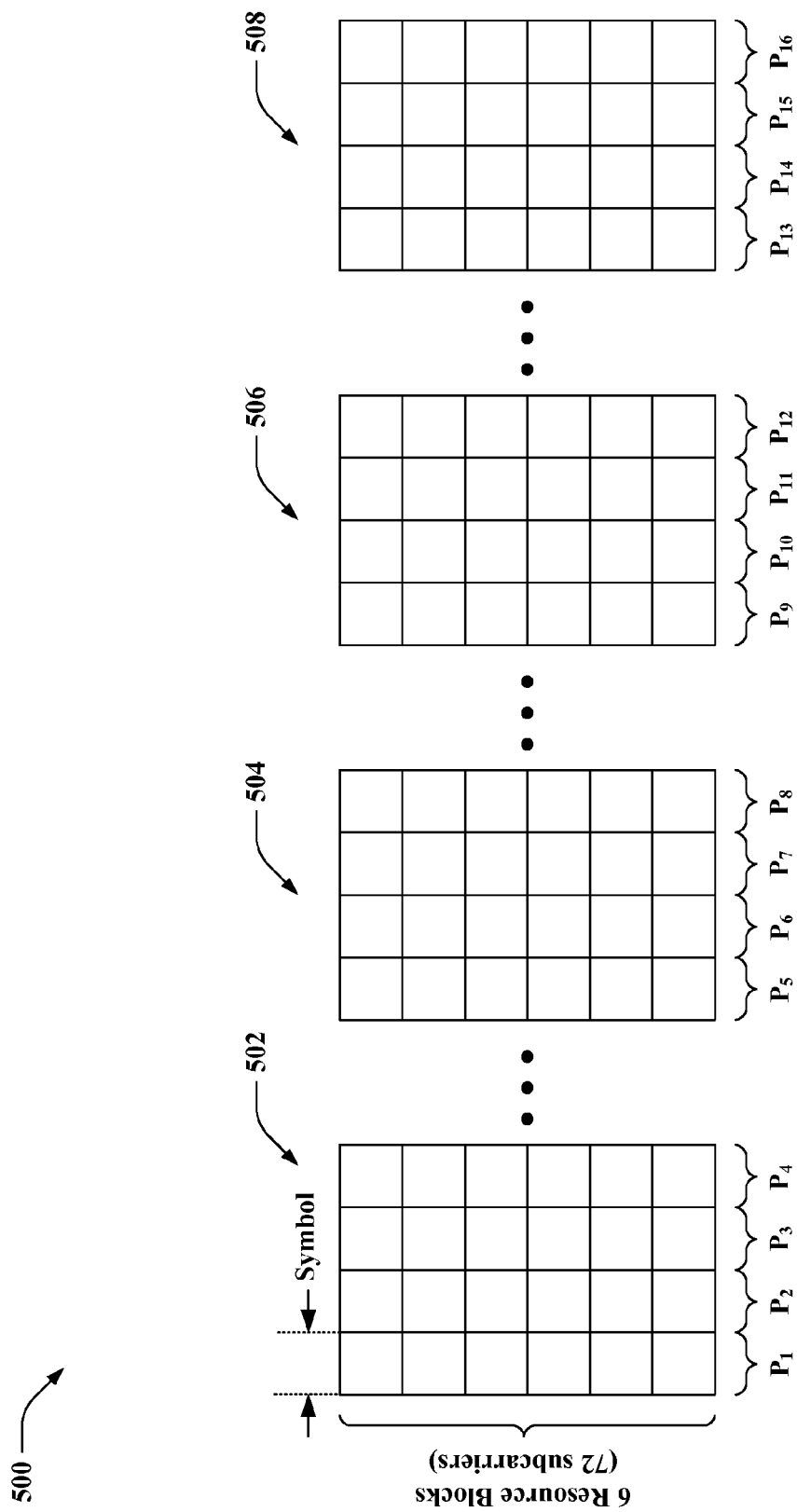
FIG. 5 is an illustration of an example puncturing pattern defined on a symbol basis that can be applied to PBCH symbols sent by an interfering base station in a wireless communication environment.

FIG. 5 illustrates example puncturing pattern 500 (e.g., puncturing pattern 214 of FIG. 2, ... ) defined on a symbol basis that can be applied to PBCH symbols sent by an interfering base station (e.g., interfering base station 202 of FIG. 2, ... ) in a wireless communication environment. For example, puncturing pattern 500 can be utilized by a femto cell base station or a pico cell base station in a heterogeneous network, while a macro cell base station (e.g., interfered base station 204 of FIG. 2, ... ) need not employ a puncturing pattern. Puncturing pattern 500 can be set for PBCH symbols included in a PBCH TTI. Accordingly, sixteen PBCH symbols included in a 40 ms PBCH TTI are depicted. The sixteen PBCH symbols are grouped in four bursts of four consecutive PBCH symbols (e.g., burst 502, burst 504, burst 506, and burst 508), where each burst is from a corresponding subframe (e.g., each burst is from a subframe 0 of a corresponding radio frame, ... ). Moreover, PBCH signals can be sent over six resource blocks (e.g., a middle 72 subcarriers, ... ). It is contemplated, however, that the claimed subject matter is not limited to employing puncturing pattern 500, as other puncturing patterns are intended to fall within the scope of the hereto appended claims.

Puncturing pattern 500 can be utilized to apply power control on PBCH symbols of the interfering base station (e.g., femto cell base station, pico cell base station, ... ), which can be a potentially strong interferer to a UE (e.g., UE 206 of FIG. 2, ... ) served by an interfered base station (e.g., interfered base station 204 of FIG. 2, macro cell base station, ... ). Puncturing pattern 500 is defined on a symbol basis. Thus, from puncturing pattern 500, the interfering base station can determine a transmit power of a first PBCH symbol in a PBCH TTI to be $P_1$, a transmit power of a second PBCH symbol in the PBCH TTI to be $P_2$, a transmit power of a third PBCH symbol in the PBCH TTI to be $P_3$, a transmit power of a fourth PBCH symbol in the PBCH TTI to be $P_4$, a transmit power of a fifth PBCH symbol in the PBCH TTI to be $P_5$, ..., and a transmit power of a sixteenth PBCH symbol in the PBCH TTI to be $P_{16}$ as shown. Accordingly, for a given PBCH symbol, the interfering base station can determine a transmit power from puncturing pattern 500 as a function of a transmit time.

Further, puncturing pattern 500 can be based upon cell ID. Thus, different cells (e.g., interfering base station 202 of FIG. 2, a differing interfering base station (not shown), ...) can have disparate, respective puncturing patterns defined on a symbol basis. Accordingly, if more than one femto cell base station collides with a macro cell base station, then the femto cell base stations can each have a corresponding puncturing pattern being a function of a cell ID that indicates power levels used for PBCH symbols sent by that femto cell base station. For instance, employing puncturing patterns that are a function of a cell ID enables randomizing the puncturing patterns with respect to each other, which can be beneficial in connection with reducing interference caused when more than one femto cell base station collides with a macro cell base station.

It is contemplated that transmit powers identified for different PBCH symbols from puncturing pattern 500 can be the same or different. Thus, the transmit power for the first PBCH symbol ($P_1$) can be the same or different as compared to the transmit power for the second PBCH symbol ($P_2$), and so forth. For example, the transmit power for the first PBCH symbol ($P_1$), the transmit power for the third PBCH symbol ($P_3$), and the transmit power for the fourth PBCH symbol ($P_4$) can be set at a first level, while the transmit power for the second PBCH symbol ($P_2$) can be set at a second level that is lower than the first level. Following this example, the second PBCH symbol sent by the interfering base station can be punctured by reducing the transmit power, $P_2$, to the second level. However, it is to be appreciated that the claimed subject matter is not limited to the foregoing example (e.g., one or more PBCH symbols from the PBCH TTI in addition to or instead of the second PBCH symbol can be punctured by reducing a corresponding transmit power, ...).

According to another example, a PBCH symbol can be punctured by inhibiting transmission. Following this example, a transmit power of the PBCH symbol that is punctured can be set to zero. By way of illustration, the seventh PBCH symbol (e.g., the third PBCH symbol in burst 504, ...) can be inhibited from being sent by the interfering base station, and thus, the transmit power of the seventh PBCH symbol ($P_7$) can be set at zero. It is contemplated, however, that the claimed subject matter is not limited to the foregoing (e.g., one or more PBCH symbols from the PBCH TTI in addition to or instead of the seventh PBCH symbol can be punctured by having a transmit power set to zero, ...).

By way of example, puncturing pattern 500 can hop over time. Following this example, during a first TTI, the transmit power of the first PBCH symbol in the first TTI can be $P_1$, the transmit power of the second PBCH symbol in the first TTI can be $P_2$, the transmit power of the third PBCH symbol in the first TTI can be $P_3$, the transmit power of the fourth PBCH symbol in the first TTI can be $P_4$, the transmit power of the fifth PBCH symbol in the first TTI can be $P_5$, and so forth. Further, during a next TTI, transmit powers for the PBCH symbols can be altered. Hence, the transmit power of the first PBCH symbol in the next TTI can be $P_{17}$ (e.g., $P_{17}$ can be the same or different compared to $P_1$, ...), the transmit power of the second PBCH symbol in the next TTI can be $P_{18}$ (e.g., $P_{18}$ can be the same or different compared to $P_2$, ...), the transmit power of the third PBCH symbol in the next TTI can be $P_{19}$ (e.g., $P_{19}$ can be the same or different compared to $P_3$, ...), the transmit power of the fourth PBCH symbol in the next TTI can be $P_{20}$ (e.g., $P_{20}$ can be the same or different compared to $P_4$, ...), the transmit power of the fifth PBCH symbol in the next TTI can be $P_{21}$ (e.g., $P_{21}$ can be the same or different compared to $P_4$, ...), and so forth. It is to be appreciated, however, that the claimed subject matter is not limited to the foregoing example.

Figure 6:
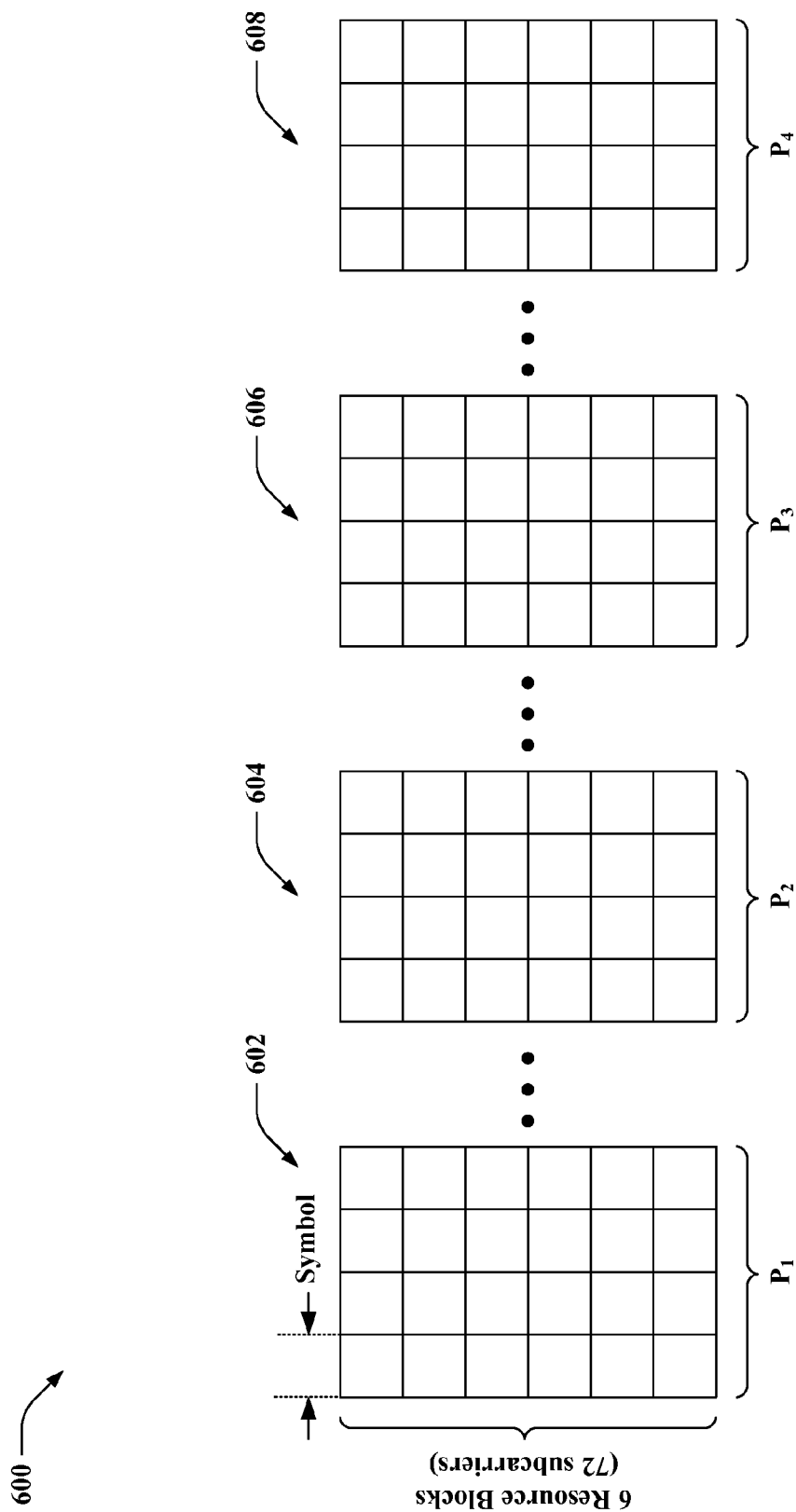
FIG. 6 is an illustration of an example puncturing pattern defined on a subframe basis that can be applied to PBCH symbols sent by an interfering base station in a wireless communication environment.

FIG. 6 illustrates an example puncturing pattern 600 (e.g., puncturing pattern 214 of FIG. 2, ...) defined on a subframe basis that can be applied to PBCH symbols sent by an interfering base station (e.g., interfering base station 202 of FIG. 2, ...) in a wireless communication environment. For example, puncturing pattern 600 can be utilized by a femto cell base station or a pico cell base station in a heterogeneous network, while a macro cell base station (e.g., interfered base station 204 of FIG. 2, ...) need not employ a puncturing pattern. Puncturing pattern 600 can be set for PBCH symbols included in a PBCH TTI. Accordingly, sixteen PBCH symbols included in a 40 ms PBCH TTI are depicted. The sixteen PBCH symbols are grouped in four bursts of four consecutive PBCH symbols (e.g., burst 602, burst 604, burst 606, and burst 608), where each burst is from a corresponding subframe (e.g., each burst is from a subframe 0 of a corresponding radio frame, ...). Moreover, PBCH signals can be sent over six resource blocks (e.g., a middle 72 subcarriers, ...). It is contemplated, however, that the claimed subject matter is not limited to employing puncturing pattern 600, as other puncturing patterns are intended to fall within the scope of the hereto appended claims.

Puncturing pattern 600 can be utilized to apply power control on PBCH symbols of the interfering base station (e.g., femto cell base station, pico cell base station, ...), which can be a potentially strong interferer to a UE (e.g., UE 206 of FIG. 2, ...) served by an interfered base station (e.g., interfered base station 204 of FIG. 2, macro cell base station, ...). Puncturing pattern 600 is defined on a subframe basis. Thus, from puncturing pattern 600, the interfering base station can determine a transmit power of a first group of four PBCH symbols from a first subframe (e.g., included in burst 602, ...) in a PBCH TTI to be $P_1$, a transmit power of a second group of four PBCH symbols from a second subframe (e.g., included in burst 604, ...) in the PBCH TTI to be $P_2$, a transmit power of a third group of four PBCH symbols from a third subframe (e.g., included in burst 606, ...) in the PBCH TTI to be $P_3$, and a transmit power of a fourth group of four PBCH symbols from a fourth subframe (e.g., included in burst 608, ...) in the PBCH TTI to be $P_4$. Accordingly, for a given group of PBCH symbols from a particular subframe, the interfering base station can determine a transmit power from puncturing pattern 600 as a function of transmit time.

Moreover, puncturing pattern 600 can be based upon cell ID. Accordingly, different cells (e.g., interfering base station 202 of FIG. 2, a differing interfering base station (not shown), ...) can have disparate, respective puncturing patterns defined on a subframe basis. Hence, if more than one femto cell base station collides with a macro cell base station, then the femto cell base stations can each have a corresponding puncturing pattern being a function of a cell ID that indicates power levels used for PBCH symbols sent by that femto cell base station. For instance, employing puncturing patterns that are a function of a cell ID enables randomizing the puncturing patterns with respect to each other, which can be beneficial in connection with reducing interference caused when more than one femto cell base station collides with a macro cell base station.

It is contemplated that transmit powers identified for different bursts from puncturing pattern 600 can be the same or different. Thus, the transmit power for PBCH symbols in burst 602 ($P_1$) can be the same or different compared to the transmit power for PBCH symbols in burst 604 ($P_2$), and so forth. According to an example, the transmit power for PBCH symbols in burst 602 ($P_1$), the transmit power for PBCH symbols in burst 604 ($P_2$), and the transmit power for PBCH symbols in burst 608 ($P_4$) can be set at a first level, while the transmit power for PBCH symbols in burst 606 ($P_3$) can be set at a second level that is lower than the first level. Following this example, PBCH symbols in burst 606 sent by interfering base station can be punctured by reducing the transmit power, $P_3$, to the second level. However, it is to be appreciated that the claimed subject matter is not limited to the foregoing example (e.g., one or more of burst 602, burst 604, and burst 608 from the PBCH TTI in addition to or instead of burst 606 can be punctured by reducing a corresponding transmit power, . . . ).

In accordance with another example, PBCH symbols in a burst can be punctured by inhibiting transmission. Hence, a transmit power of the PBCH symbols in the burst that are punctured can be set to zero. For instance, the PBCH symbols in burst 602 can be inhibited from being sent by the interfering base station, and thus, the transmit power of the PBCH symbols in burst 602 can be set at zero. It is contemplated, however, that the claimed subject matter is not limited to the foregoing (e.g., one or more of burst 604, burst 606, and burst 608 from the PBCH TTI in addition to or instead of burst 602 can be punctured by having a transmit power set to zero, . . . ).

By way of further example, puncturing pattern 600 can hop over time. Pursuant to this example, during a first TTI, the transmit power of PBCH symbols in burst 602 in the first TTI can be $P_1$, the transmit power of PBCH symbols in burst 604 in the first TTI can be $P_2$, the transmit power of PBCH symbols in burst 606 in the first TTI can be $P_3$, and the transmit power of PBCH symbols in burst 608 in the first TTI can be $P_4$. Further, during a next TTI, transmit powers for the PBCH symbols can be modified. Hence, the transmit power of PBCH symbols in burst 602 in the next TTI can be $P_5$ (e.g., $P_5$ can be the same or different compared to $P_1$, . . . ), the transmit power of PBCH symbols in burst 604 in the next TTI can be $P_6$ (e.g., $P_6$ can be the same or different compared to $P_2$, . . . ), the transmit power of PBCH symbols in burst 606 in the next TTI can be $P_7$ (e.g., $P_7$ can be the same or different compared to $P_3$, . . . ), and the transmit power of PBCH symbols in burst 608 in the next TTI can be $P_8$ (e.g., $P_8$ can be the same or different compared to $P_4$, . . . ). However, it is to be appreciated that the claimed subject matter is not limited to the above example.

Again, reference is made to FIG. 2. Puncturing pattern 214 (e.g., puncturing pattern 500 of FIG. 5, puncturing pattern 600 of FIG. 6, . . . ) can be a function of cell ID and can hop over time. Moreover, puncturing pattern 214 can be designed to provide a weak cell (e.g., interfered base station 204, . . . ) with at least X interference-free PBCH symbols in T radio frames (10*T ms duration), where X and T can be integers. Thus, UE 206 (e.g., which can be unable to access interfering base station 202, . . . ) can see X interference-free PBCH symbols from interfered base station 204 during a duration of 10*T ms. The interference-free PBCH symbols can be yielded by power control component 212 reducing the transmit power of interfering base station 202 based upon puncturing pattern 214. It is contemplated that a larger value of X degrades PBCH performance of interfering base station 202, but can substantially increase PBCH detection probability of decoding component 224 for the weak cell (e.g., from interfered base station 204, . . . ). The value set for X can be dependent upon a desired coverage for interfered base station 204; however, it is to be appreciated that the claimed subject matter is not so limited.

By way of another example, puncturing pattern 214 can cluster punctured PBCH symbols within a 40 ms PBCH frame (e.g., PBCH TTI, . . . ) when interfering base station 202 is a strong interferer. Thus, rather than scattering the punctured PBCH symbols within the PBCH frame, higher PBCH detection probability of decoding component 224 for the weak cell (e.g., from interfered base station 204, . . . ) can result from clustering the punctured PBCH symbols. For instance, if three PBCH symbols are punctured out of the sixteen PBCH symbols in a PBCH frame, then the three punctured PBCH symbols can be clustered together (e.g., three consecutive PBCH symbols, three PBCH symbols out of Y consecutive PBCH symbols in the PBCH frame where Y is an integer less than sixteen, . . . ) rather than scattering the three punctured PBCH symbols across the sixteen PBCH symbols in the PBCH frame.

Pursuant to yet another example, puncturing pattern 214 can distribute punctured PBCH symbols. For instance, the punctured PBCH symbols can be distributed within a 40 ms PBCH frame (e.g., PBCH TTI, . . . ). According to another illustration, the punctured PBCH symbols can be distributed across multiple PBCH frames (e.g., multiple PBCH TTIs, . . . ).

In accordance with a further example, in a weak cell (e.g., associated with interfered base station 204, . . . ), if UE 206 lacks knowledge of puncturing pattern 214, then UE 206 can have a higher PBCH detection probability when more punctured PBCH symbols are in a lower redundancy version (RV) number. Yet, it is to be appreciated that the claimed subject matter is not so limited.

Figure 7:
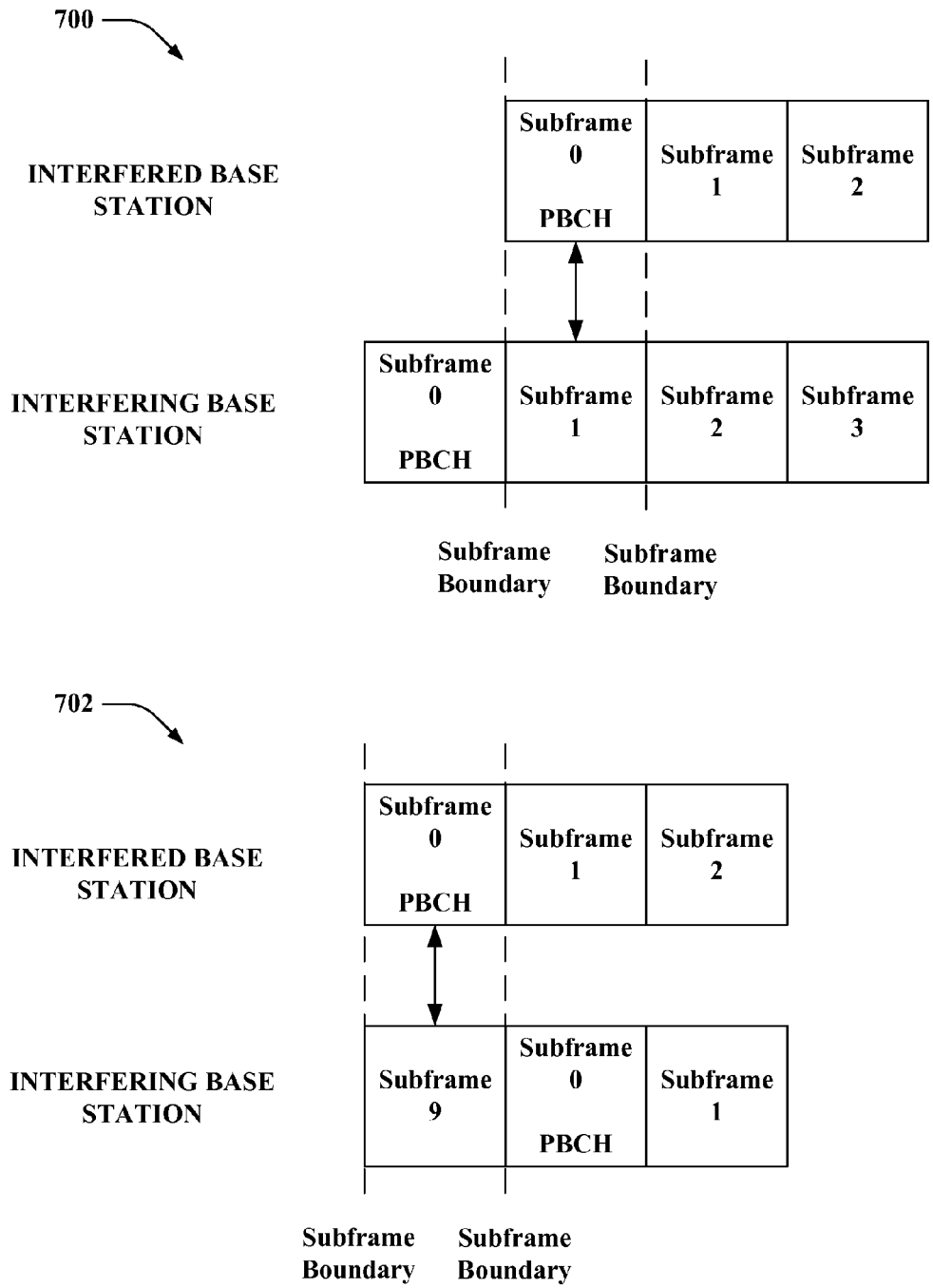
FIG. 7 is an illustration of example subframe timing diagrams in a semi-synchronous heterogeneous wireless communication environment.

FIG. 7 illustrates example subframe timing diagrams in a semi-synchronous heterogeneous wireless communication environment. In a semi-synchronous system, a power control component (e.g., power control component 212 of FIG. 2, . . . ) can puncture Physical Downlink Shared Channel (PDSCH) symbol(s) sent from an interfering base station (e.g., interfering base station 202 of FIG. 2, . . . ) based upon a puncturing pattern (e.g., puncturing pattern 214 of FIG. 2, . . . ). It is to be appreciated, however, that FIG. 7 is provided for illustration purposes, and the claimed subject matter is not limited to the example subframe timing diagrams depicted.

In a semi-synchronous system, a subframe boundary can be common to neighbor cells, but a subframe index can differ across cells. As shown in subframe timing diagram 700 and subframe timing diagram 702, subframe boundaries can align between an interfered base station (e.g., interfered base station 204 of FIG. 2, . . . ) and an interfering base station (e.g., interfering base station 202 of FIG. 2, . . . ). However, PBCH signals from an interfering base station (e.g., neighbor cell, . . . ) may not collide with PBCH signals from an interfered base station (e.g., serving cell, . . . ) due to differences in subframe indices. Pursuant to the depicted examples, PBCH signals included in subframe 0 from the interfered base station can collide with signals included in subframe 1 from the interfering base station in subframe timing diagram 700, and PBCH signals included in subframe 0 from the interfered base station can collide with signals included in subframe 9 from the interfering base station in subframe timing diagram 702. Further, it can be assumed that a difference in subframe indices between the interfering base station and the interfered base station (e.g., between a strong cell and a weak cell, . . . ) can be known to the interfering base station (e.g., the strong cell, . . . ).

Accordingly, the interfering base station can puncture a PDSCH transmission on the center six RBs when PBCH of the interfered base station is being transmitted. For instance, the power control component can puncture PDSCH symbols or subframes that collide with PBCH signals from the interfered base station based upon the puncturing pattern. By way of illustration, an entire subframe (e.g., subframe 1 from subframe timing diagram 700, subframe 9 from subframe timing diagram 702, . . . ) or a slot (e.g., second slot of subframe 1 from subframe timing diagram 700, second slot of subframe 9 from subframe timing diagram 702, . . . ) corresponding to the PBCH symbols of the interfered base station can be punctured (e.g., a subframe or slot corresponding to PBCH symbols of a weak cell can be avoided in scheduling PDSCH of a strong cell, . . . ). Similar to the above discussion, the puncturing pattern can be a function of cell ID and can hop over time.

Figure 8:
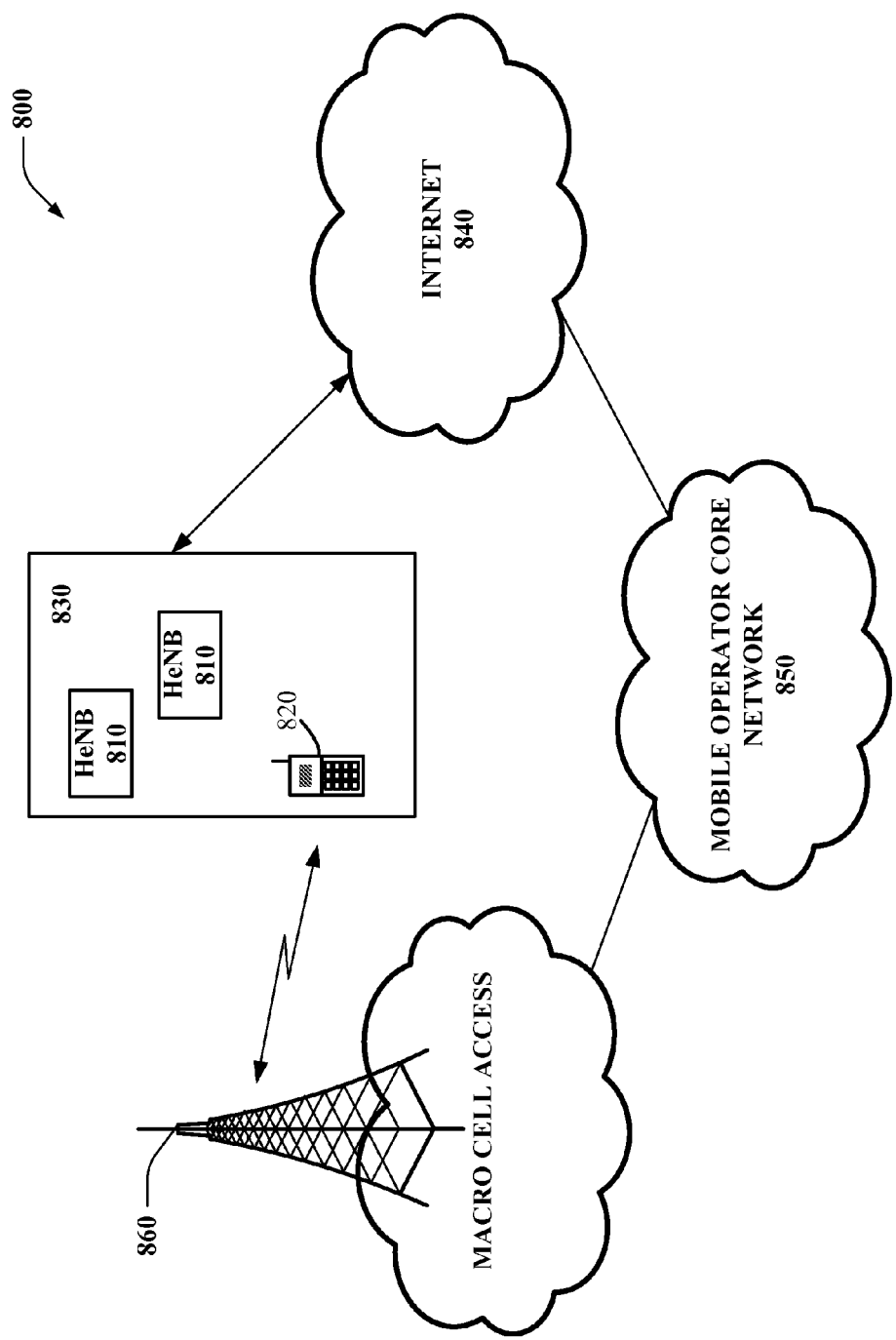
FIG. 8 is an illustration of an example communication system that enables deployment of access point base stations (e.g., femto cell base stations, . . . ) within a network environment.

FIG. 8 illustrates an exemplary communication system 800 that enables deployment of access point base stations (e.g., femto cell base stations, . . . ) within a network environment. As shown in FIG. 8, system 800 includes multiple femto cell base stations, which can also be referred to as access point base stations, Home Evolved Node B units (HeNBs), Home Node B unit (HNB), femto cells, or the like. The femto cell base stations (HeNBs 810), for example, can each be installed in a corresponding small scale network environment, such as, for example, in one or more user residences 830, and can each be configured to serve associated, as well as alien, UE(s) 820. Each HeNB 810 is further coupled to the Internet 840 and a mobile operator core network 850 via a DSL router (not shown) or, alternatively, a cable modem (not shown).

Although embodiments described herein use 3GPP terminology, it is to be understood that the embodiments may be applied to 3GPP (Re199, Re15, Re16, Re17) technology, as well as 3GPP2 (1xRTT, 1xEV-DO Re10, RevA, RevB) technology and other known and related technologies. In such embodiments described herein, the owner of HeNB 810 can subscribe to mobile service, such as, for example, 3G mobile service, offered through the mobile operator core network 850, and UE 820 can be capable to operate both in a macro cellular environment via a macro cell base station 860 and in a residential small scale network environment. Thus, HeNB 810 can be backward compatible with any existing UE 820.

Figure 9:
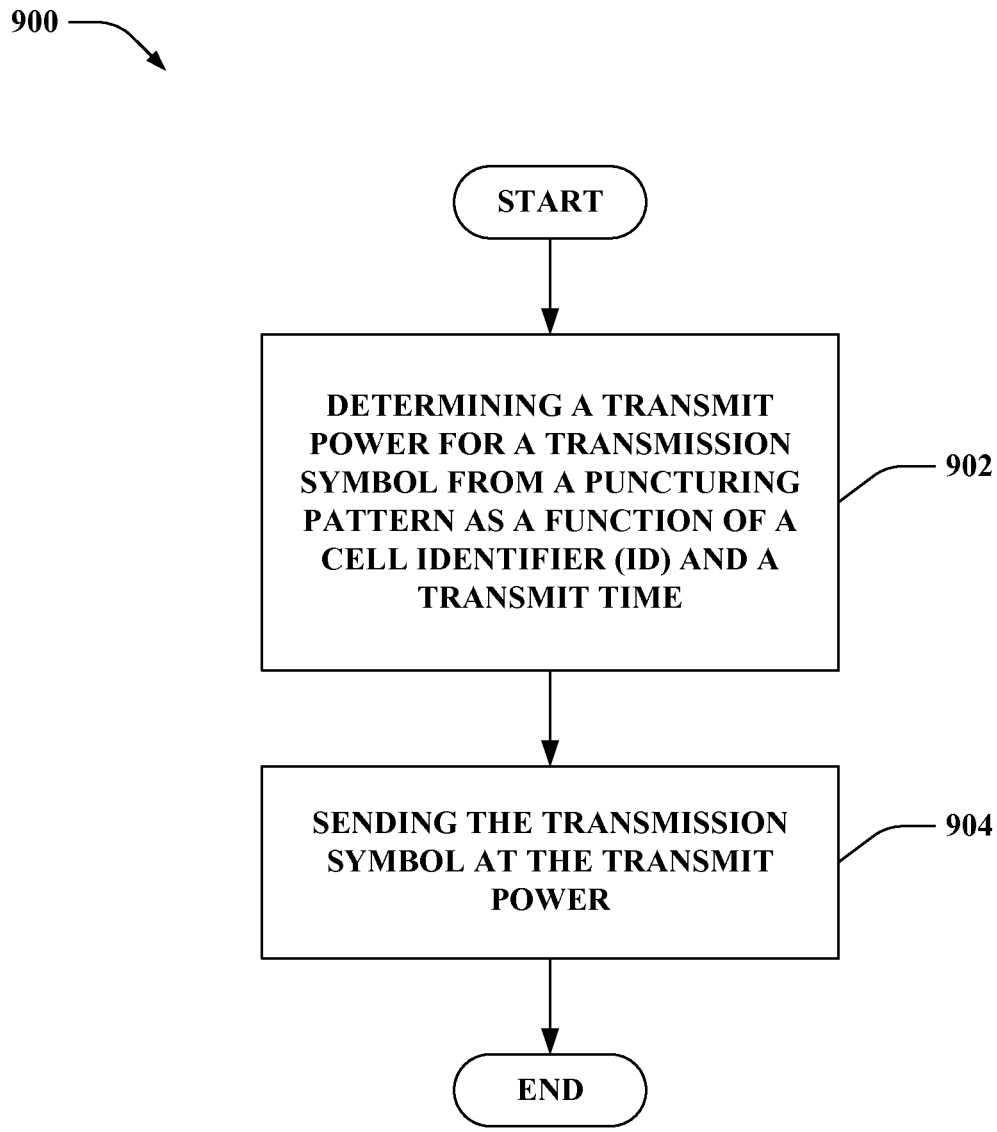
FIG. 9 is an illustration of an example methodology that facilitates controlling interference in a heterogeneous wireless communication environment.
Figure 10:
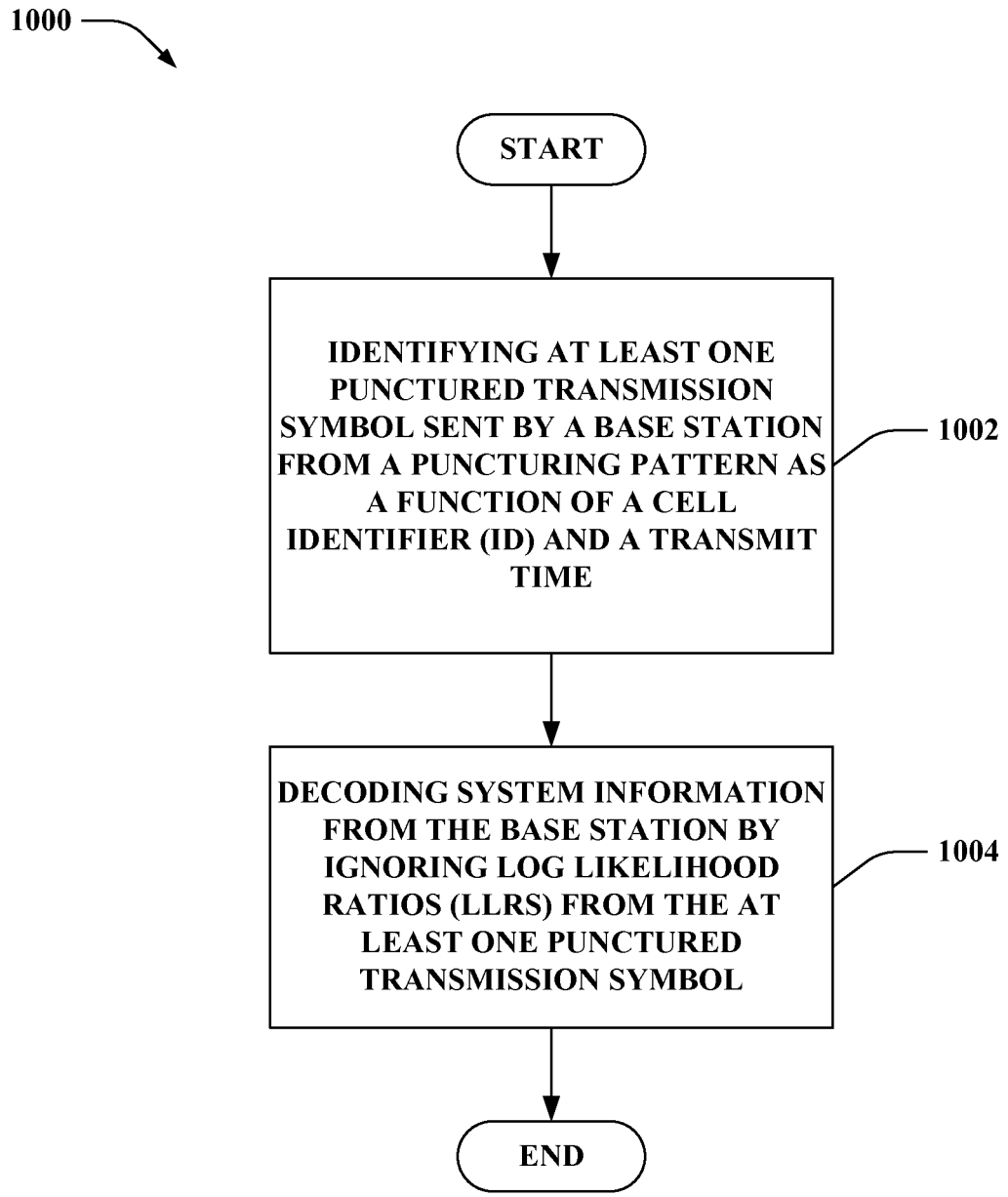
FIG. 10 is an illustration of an example methodology that facilitates detecting system information in a heterogeneous wireless communication environment.

FIGS. 9-10 illustrate methodologies relating to controlling interference in a heterogeneous wireless communication environment. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

FIG. 9 illustrates a methodology 900 that facilitates controlling interference in a heterogeneous wireless communication environment. At 902, a transmit power for a transmission symbol can be determined from a puncturing pattern as a function of a cell identifier (ID) and a transmit time. The transmission symbols, for example, can be a Physical Broadcast Channel (PBCH) symbol. Further, the cell ID can be a femto cell ID, a macro cell ID, and so forth. For instance, the puncturing pattern can hop over time. Further, the puncturing pattern can be defined on a subframe basis or a symbol basis. Moreover, the puncturing pattern can cluster punctured transmission symbols (e.g., PBCH symbols, . . . ) in a frame (e.g., PBCH frame, . . . ), for example. According to another example, the puncturing pattern can distribute punctured transmission symbols (e.g., PBCH symbols, . . . ) in a frame (e.g., PBCH frame, . . . ). In accordance with yet another example, the puncturing pattern can distributed punctured transmission symbols across multiple frames (e.g., multiple PBCH frames, . . . ). At 904, the transmission symbol can be sent at the transmit power.

According to an example, the puncturing pattern can be defined on a subframe basis. By way of illustration, the puncturing pattern can set a transmit power for a particular set of transmission symbols (e.g., a particular set of PBCH symbols, . . . ) in a particular subframe from a frame (e.g., PBCH frame, . . . ) at a first level and can set a transmit power for a disparate set of transmission symbols (e.g., a disparate set of PBCH symbols, . . . ) in a disparate subframe from the frame at a second level that is lower than the first level to puncture the disparate set of transmission symbols in the disparate subframe. Pursuant to another illustration, the puncturing pattern can set a transmit power for a particular set of transmission symbols (e.g., a particular set of PBCH symbols, . . . ) in a particular subframe from a frame (e.g., PBCH frame, . . . ) at a given level and can inhibit transmission of a disparate set of transmission symbols (e.g., a disparate set of PBCH symbols, . . . ) in a disparate subframe from the frame by setting a corresponding transmit power to zero to puncture the disparate set of transmission symbols in the disparate subframe.

In accordance with another example, the puncturing pattern can be defined on a symbol basis. According to an illustration, the puncturing pattern can set a transmit power for a particular transmission symbol (e.g., a particular PBCH symbol, . . . ) from a frame (e.g., PBCH frame, . . . ) at a first level and can set a transmit power for a disparate transmission symbol (e.g., a disparate PBCH symbol, . . . ) from the frame at a second level that is lower than the first level to puncture the disparate transmission symbol. By way of another illustration, the puncturing pattern can set a transmit power for a particular transmission symbol (e.g., a particular PBCH symbol, . . . ) from a frame (e.g., PBCH frame, . . . ) at a given level and can inhibit transmission of a disparate transmission symbol (e.g., a disparate PBCH symbol, . . . ) from the frame by setting a corresponding transmit power to zero to puncture the disparate transmission symbol.

According to a further example, a transmit power of a Physical Downlink Shared Channel (PDSCH) transmission on a center six resource blocks (RBs) can be reduced when the PDSCH transmission collides with PBCH signals from a neighbor base station. For instance, the transmit power can be reduced for a subframe or a slot. Reduction of the transmit power of the PDSCH transmission can occur in a semi-synchronous wireless communication environment.

FIG. 10 illustrates a methodology 1000 that facilitates detecting system information in a heterogeneous wireless communication environment. At 1002, at least one punctured transmission symbol sent by a base station can be identified from a puncturing pattern as a function of a cell identifier (ID) and a transmit time. The at least one punctured transmission symbol, for example, can be at least one Physical Broadcast Channel (PBCH) symbol. Further, the cell ID can be a macro cell ID, a femto cell ID, and so forth. For instance, the puncturing pattern can hop over time. Further, the puncturing pattern can be defined on a subframe basis or a symbol basis. At 1004, system information from the base station can be decoded by ignoring log likelihood ratios (LLRs) from the at least one punctured transmission symbol.

It will be appreciated that, in accordance with one or more aspects described herein, inferences can be made pertaining to puncturing transmission symbols in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
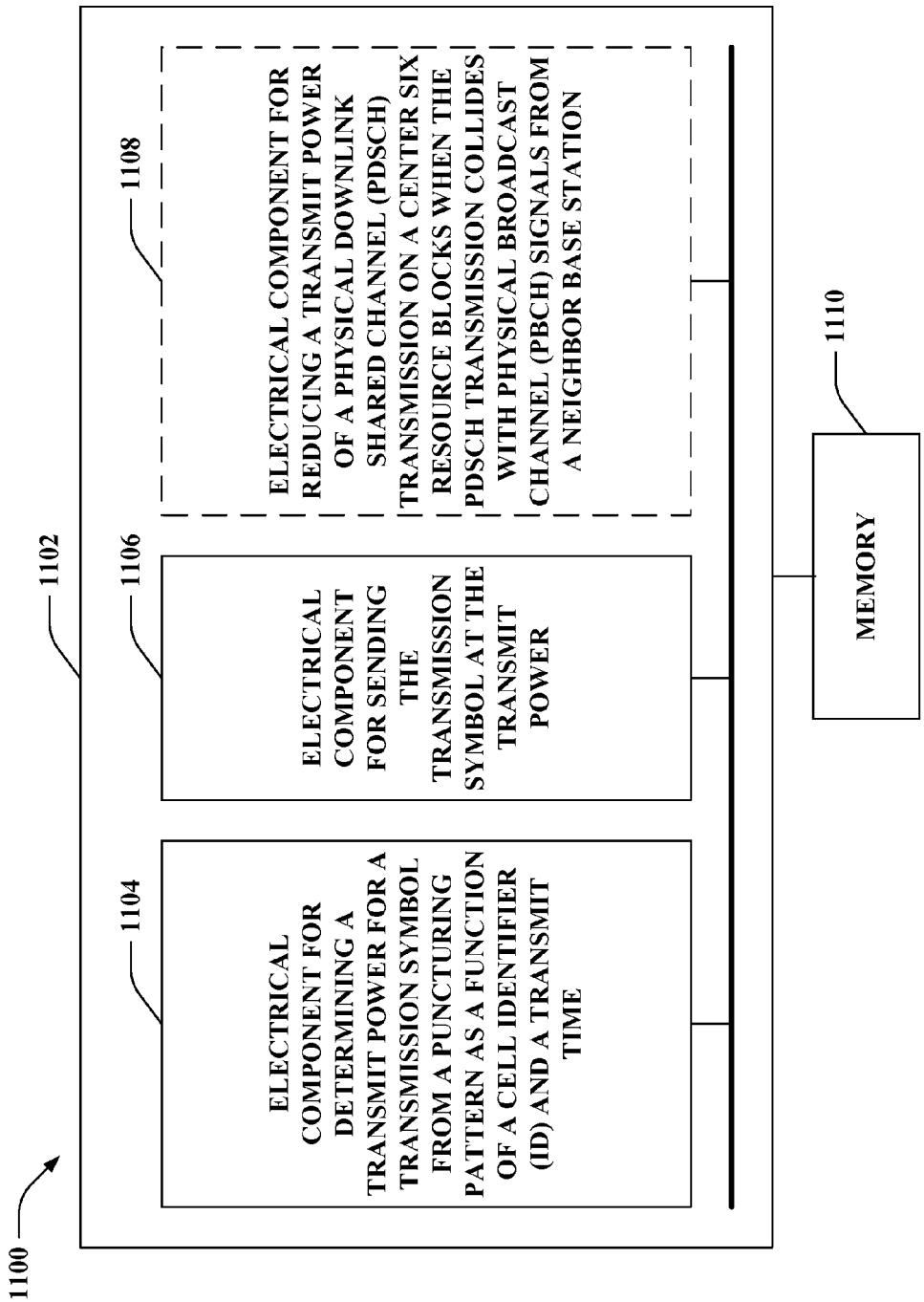
FIG. 11 is an illustration of an example system that enables managing interference in a heterogeneous wireless communication environment.

FIG. 11 illustrates a system 1100 that enables managing interference in a heterogeneous wireless communication environment. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining a transmit power for a transmission symbol from a puncturing pattern as a function of a cell identifier (ID) and a transmit time 1104. Moreover, logical grouping 1102 can include an electrical component for sending the transmission symbol at the transmit power. Logical grouping 1102 can also optionally include an electrical component for reducing a transmit power of a Physical Downlink Shared Channel (PDSCH) transmission on a center six resource blocks when the PDSCH transmission collides with Physical Broadcast Channel (PBCH) signals from a neighbor base station 1108. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

Figure 12:
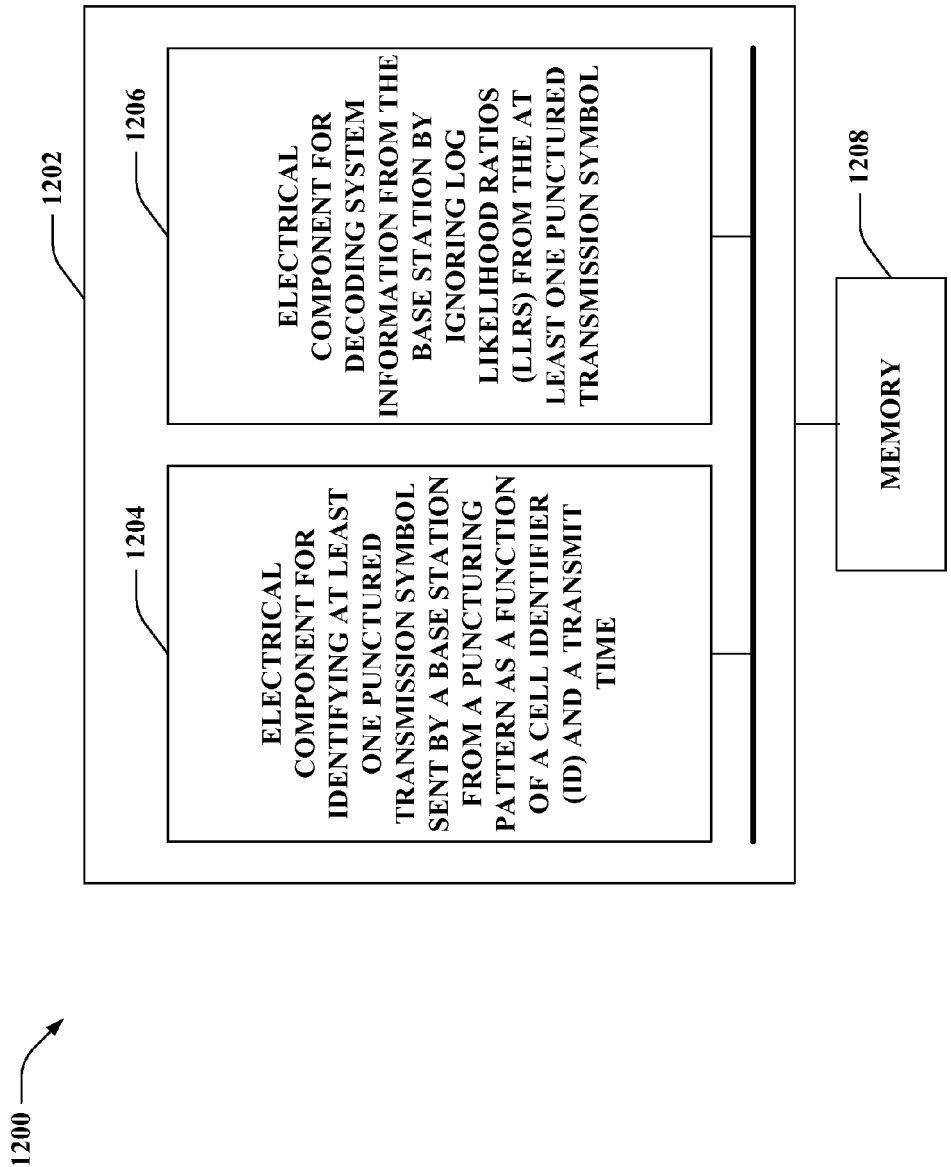
FIG. 12 is an illustration of an example system that enables obtaining system information in a wireless communication environment.

FIG. 12 illustrates a system 1200 that enables obtaining system information in a wireless communication environment. For example, system 1200 can reside within a UE. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for identifying at least one punctured transmission symbol sent by a base station from a puncturing pattern as a function of a cell identifier (ID) and a transmit time 1204. Further, logical grouping 1202 can include an electrical component for decoding system information from the base station by ignoring log likelihood ratios (LLRs) from the at least one punctured transmission symbol 1206. Additionally, system 1200 can include a memory 1208 that retains instructions for executing functions associated with electrical components 1204 and 1206. While shown as being external to memory 1208, it is to be understood that one or more of electrical components 1204 and 1206 can exist within memory 1208.

Figure 13:
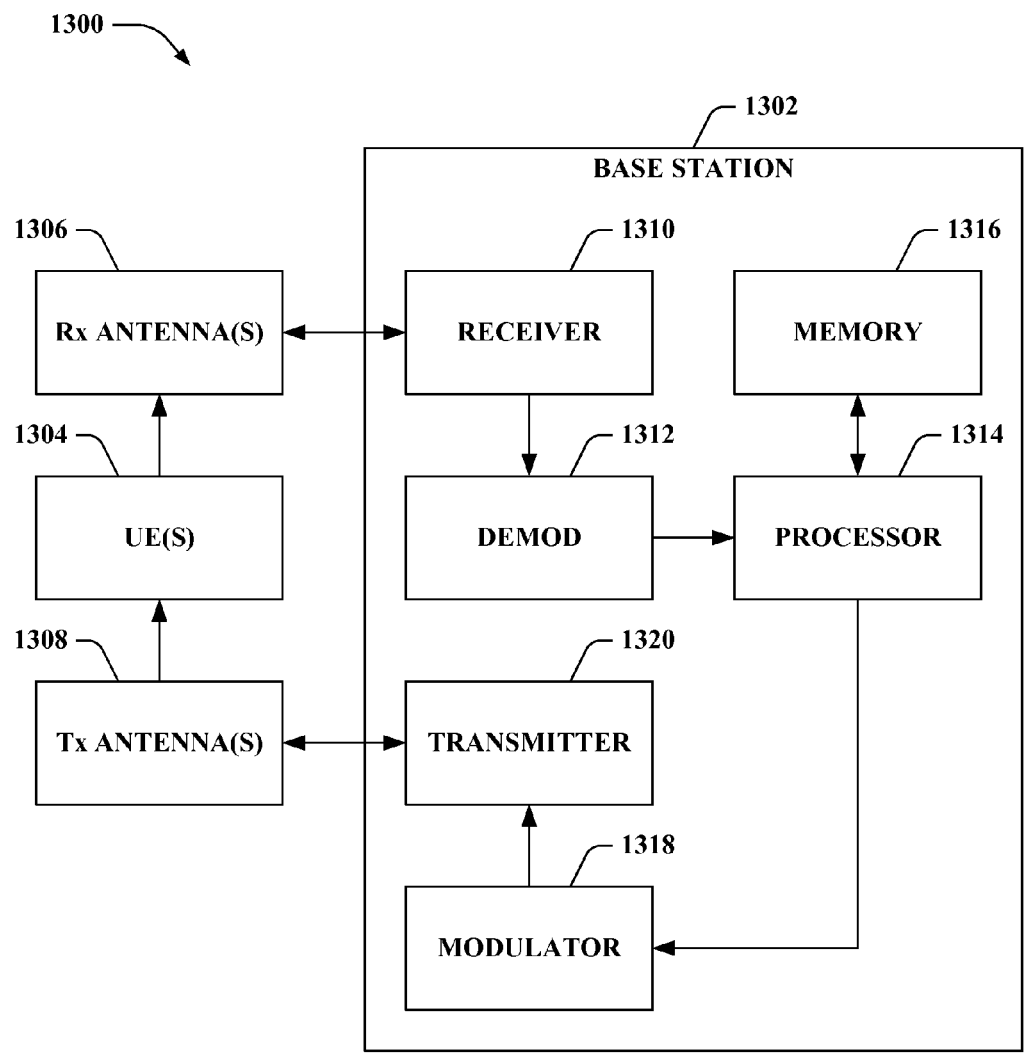
FIGS. 13-14 are illustrations of example systems that can be utilized to implement various aspects of the functionality described herein.

FIG. 13 is an illustration of a system 1300 that can be utilized to implement various aspects of the functionality described herein. System 1300 can include a base station 1302 (e.g., interfering base station 202, interfered base station 204, . . . ). Base station 1302 can receive signal(s) from one or more UEs 1304 via one or more receive (Rx) antennas 1306 and transmit to the one or more UEs 1304 via one or more transmit (Tx) antennas 1308. Further, base station 1302 can include a receiver 1310 that receives information from receive antenna(s) 1306. According to an example, receiver 1310 can be operatively associated with a demodulator (demod) 1312 that demodulates received information. Demodulated symbols can be analyzed by a processor 1314. Processor 1314 can be coupled to memory 1316, which can store data to be transmitted to or received from UE(s) 1304 and/or any other suitable protocols, algorithms, information, etc. related to performing the various actions and functions set forth herein. For example, base station 1302 can employ processor 1314 to perform methodology 900 and/or other similar and appropriate methodologies. Base station 1302 can further include a modulator 1318 that can multiplex a signal for transmission by a transmitter 1320 through antenna(s) 1308.

Processor 1314 can be a processor dedicated to analyzing information received by receiver 1310, dedicated to generating information for transmission by transmitter 1320, or dedicated to controlling one or more components of base station 1302. According to another example, processor 1314 can analyze information received by receiver 1310, generate information for transmission by transmitter 1320, and control one or more components of base station 1302. The one or more components of base station 1302 can include, for example, coding component 208, power control component 212, broadcast component 216, coding component 218, and/or broadcast component 222. Moreover, although not shown, it is contemplated that the one or more components of base station 1302 can be part of processor 1314 or a plurality of processors (not shown).

Figure 14:
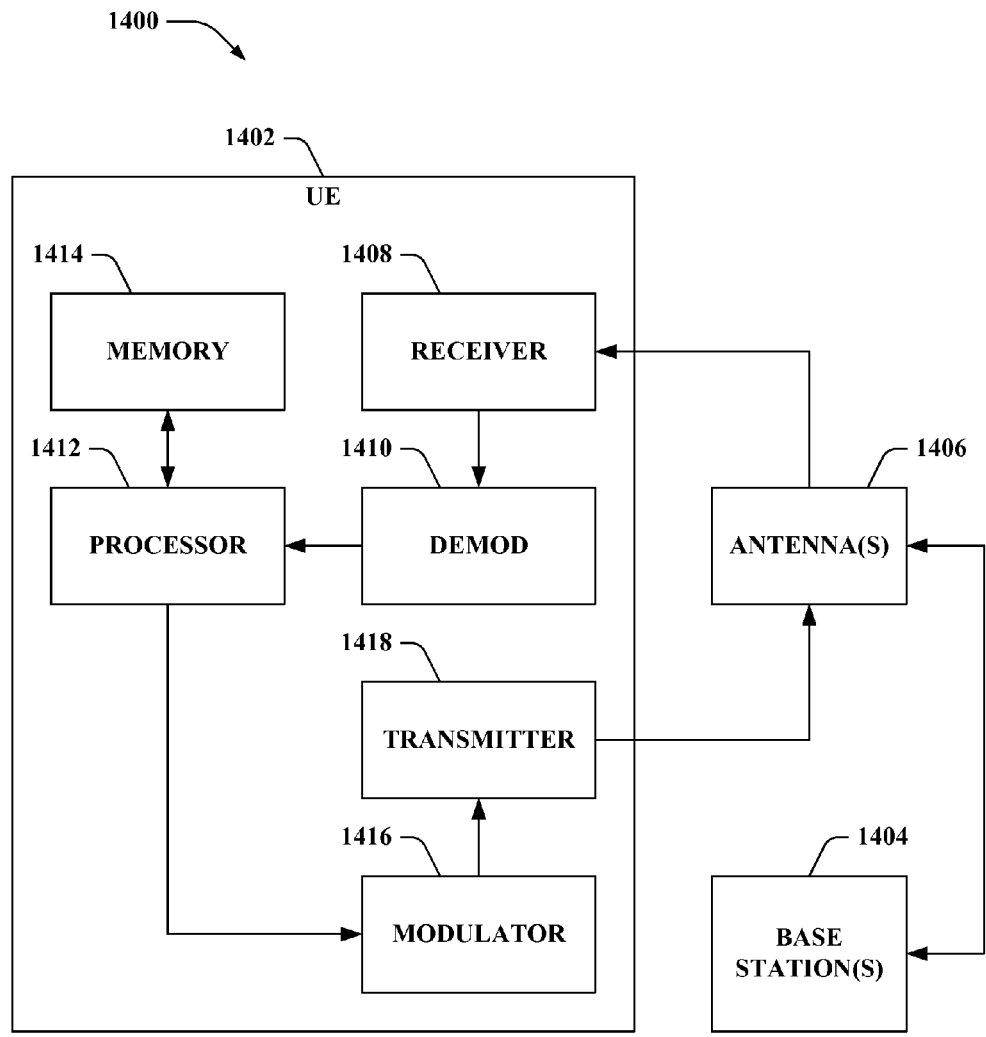

FIG. 14 is an illustration of a system 1400 that can be utilized to implement various aspects of the functionality described herein. System 1400 can include a UE 1402 (e.g., UE 206, . . . ). UE 1402 can receive signal(s) from one or more base stations 1404 and/or transmit to one or more base stations 1404 via one or more antennas 1406. Further, UE 1402 can include a receiver 1408 that receives information from antenna(s) 1406. According to an example, receiver 1408 can be operatively associated with a demodulator (demod) 1410 that demodulates received information. Demodulated symbols can be analyzed by a processor 1412. Processor 1412 can be coupled to memory 1414, which can store data to be transmitted to or received from base station(s) 1404 and/or any other suitable protocols, algorithms, information, etc. related to performing the various actions and functions set forth herein. For example, UE 1402 can employ processor 1412 to perform methodology 1000 and/or other similar and appropriate methodologies. UE 1402 can further include a modulator 1416 that can multiplex a signal for transmission by a transmitter 1418 through antenna(s) 1406.

Processor 1412 can be a processor dedicated to analyzing information received by receiver 1408, dedicated to generating information for transmission by transmitter 1418, or dedicated to controlling one or more components of UE 1402. According to another example, processor 1412 can analyze information received by receiver 1408, generate information for transmission by transmitter 1418, and control one or more components of UE 1402. The one or more components of UE 1402 can include, for example, decoding component 224 and/or information detection component 226. Moreover, although not shown, it is contemplated that the one or more components of UE 1402 can be part of processor 1412 or a plurality of processors (not shown).

Figure 15:
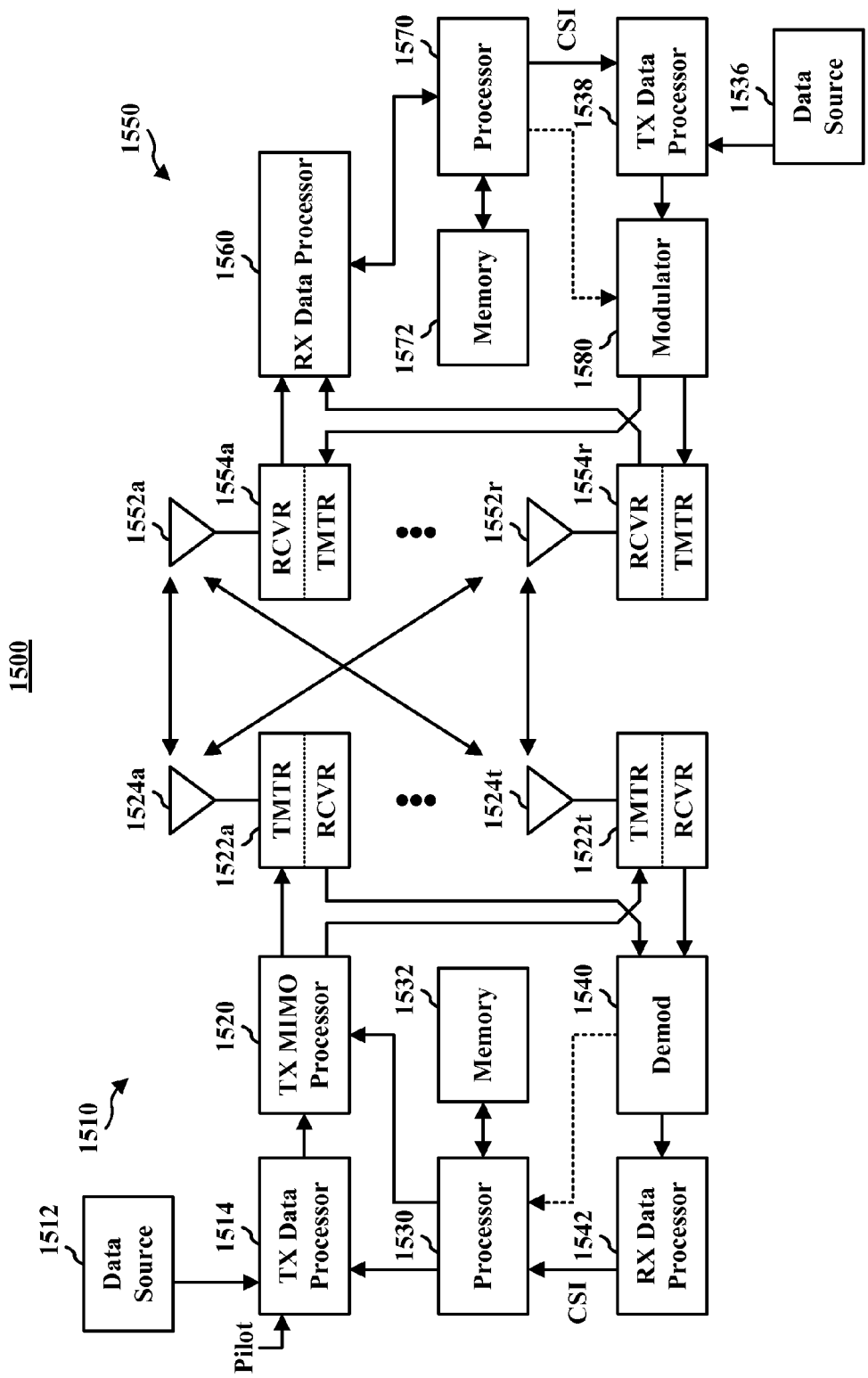
FIG. 15 is an illustration of an example wireless communication system that can be employed in conjunction with the various systems and methods described herein.

FIG. 15 shows an example wireless communication system 1500. Wireless communication system 1500 depicts one base station 1510 and one UE 1550 for sake of brevity. However, it is to be appreciated that system 1500 can include more than one base station and/or more than one UE, wherein additional base stations and/or UEs can be substantially similar or different from example base station 1510 and UE 1550 described below. In addition, it is to be appreciated that base station 1510 and/or UE 1550 can employ the systems (FIGS. 1-2, 8 and 11-14) and/or methods (FIGS. 9-10) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At UE 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and down-converts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from UE 1550 are received by antennas 1524, conditioned by receivers 1522, demodulated by a demodulator 1540, and processed by a RX data processor 1542 to extract the reverse link message transmitted by UE 1550. Further, processor 1530 can process the extracted message to determine which precoding matrix to use for determining the beamforming weights.

Processors 1530 and 1570 can direct (e.g., control, coordinate, manage, etc.) operation at base station 1510 and UE 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates controlling interference in a wireless communication environment, comprising:
   determining a first transmit power for a first transmission symbol from a puncturing pattern as a function of a cell identifier (ID) of an interfering base station and a first transmit time in a first subframe;
   determining a second transmit power for a second transmission symbol from the puncturing pattern as a function of the cell ID and a second transmit time in a second subframe,
   wherein the puncturing pattern is defined on a subframe basis and sets the first transmit power for the first transmission symbol in the first subframe from a frame at a first level and sets the second transmit power for the second transmission symbol in the second subframe from the frame at a second level that is lower than the first level;
   sending the first transmission symbol at the first transmit power; and
   sending the second transmission symbol at the second transmit power.

2. The method of claim 1, wherein the transmission symbol is a Physical Broadcast Channel (PBCH) symbol.

3. The method of claim 1, wherein the cell ID is a macro cell ID.

4. The method of claim 1, wherein the cell ID is a femto cell ID.

5. The method of claim 1, wherein the puncturing pattern hops over time.

6. The method of claim 1, wherein the puncturing pattern punctures a set of transmission symbols in the second subframe.

7. The method of claim 1, wherein the frame is a Physical Broadcast Channel (PBCH) frame.

8. The method of claim 1, wherein the puncturing pattern sets the transmit power for a first set of transmission symbols in the first subframe from the frame at a given level and inhibits transmission of a second set of transmission symbols in the second subframe from the frame by setting the second transmit power for the second set of transmission symbols in the second subframe to zero to puncture the second set of transmission symbols in the second subframe.

9. The method of claim 8, wherein the frame is a Physical Broadcast Channel (PBCH) frame.

10. The method of claim 1, further comprising reducing a transmit power of a Physical Downlink Shared Channel (PDSCH) transmission on a center six resource blocks when the PDSCH transmission collides with Physical Broadcast Channel (PBCH) signals from a neighbor base station.

11. The method of claim 1, wherein the puncturing pattern clusters punctured transmission symbols in a frame.

12. The method of claim 1, wherein the puncturing pattern distributes punctured transmission symbols in a frame.

13. The method of claim 1, wherein the punctured pattern distributes punctured transmission symbols across multiple frames.

14. A method that facilitates controlling interference in a heterogeneous wireless communication environment, comprising:
   determining a first transmit power for a first transmission symbol from a puncturing pattern as a function of a cell identifier (ID) of an interfering base station and a first transmit time;
   determining a second transmit power for a second transmission symbol from the puncturing pattern as a function of the cell ID and a second transmit time,
   wherein the puncturing pattern is defined on a symbol basis and sets a transmit power for the first transmission symbol from a frame at a first level and sets a second power for the second transmission symbol from the frame at a second level that is lower than the first level to puncture the second transmission symbol;
   sending the first transmission symbol at the first transmit power; and
   sending the second transmission symbol at the second transmit power.

15. The method of claim 14, wherein the puncturing pattern sets the first transmit power for the first transmission symbol from the frame at a given level and inhibits transmission of the second disparate transmission symbol from the frame by setting the second transmit power for the second transmission symbol from the frame to zero to puncture the second transmission symbol.

16. A wireless communications apparatus, comprising:
   a memory that retains instructions related to determining a first transmit power for a first transmission symbol from a puncturing pattern as a function of a cell identifier (ID) of an interfering base station and a first transmit time in a first subframe, determining a second transmit power for a second transmission symbol from the puncturing pattern as a function of the cell ID and a second transmit time in a second subframe, wherein the puncturing pattern is defined on a subframe basis and sets the first transmit power for the first transmission in the in the first subframe from a frame at a first level and sets the second transmit power for a second transmission symbol in the second subframe from the frame at a second level that is lower than the first level, broadcasting the first transmission symbol at the first transmit power, and broadcasting the second transmission symbol at the second transmit power; and
   a processor, coupled to the memory, configured to execute the instructions retained in the memory.

17. The wireless communications apparatus of claim 16, wherein the transmission symbol is a Physical Broadcast Channel (PBCH) symbol.

18. The wireless communications apparatus of claim 16, wherein the cell ID is one of a femto cell ID or a macro cell ID.

19. The wireless communications apparatus of claim 16, wherein the puncturing pattern hops over time.

20. The wireless communications apparatus of claim 16, wherein the puncturing pattern punctures a set of transmission symbols in the disparate second subframe.

21. The wireless communications apparatus of claim 16, wherein the puncturing pattern sets the transmit power for a first set of transmission symbols in the first subframe from the frame at a given level and inhibits transmission of a second set of transmission symbols in the second subframe from the frame by setting the second transmit power for the second set of transmission symbols from the frame to zero to puncture the second set of transmission symbols in the second subframe.

22. The wireless communications apparatus of claim 16, wherein the memory further retains instructions related to reducing a transmit power of a Physical Downlink Shared Channel (PDSCH) transmission on a center six resource blocks when the PDSCH transmission collides with Physical Broadcast Channel (PBCH) signals from a neighbor base station.

23. The wireless communications apparatus of claim 16, wherein the puncturing pattern clusters punctured transmission symbols in a frame.

24. The wireless communications apparatus of claim 16, wherein the puncturing pattern distributes punctured transmission symbols in a frame.

25. A wireless communications apparatus, comprising:
a memory that retains instructions related to determining a first transmit power for a first transmission symbol from a puncturing pattern as a function of a cell identifier (ID) of an interfering base station and a first transmit time, determining a second transmit power for a second transmission symbol from the puncturing pattern as a function of the cell ID and a second transmit time, broadcasting the first transmission symbol at the first transmit power, and broadcasting the second transmission symbol at the second transmit power; and
a processor, coupled to the memory, configured to execute the instructions retained in the memory,
wherein the puncturing pattern is defined on a symbol basis and sets the first transmit power for the first transmission symbol from a frame at a first level and sets the second transmit power for the second transmission symbol from the frame at a second level that is lower than the first level to puncture the second transmission symbol.

26. The wireless communications apparatus of claim 25, wherein the puncturing pattern sets the first transmit power for the first transmission symbol from the frame at a given level and inhibits transmission of the second transmission symbol from the frame by setting the second transmit power for the second transmission symbol from the frame to zero to puncture the second transmission symbol.

27. The wireless communications apparatus of claim 16, wherein the punctured pattern distributes punctured transmission symbols across multiple frames.

28. A wireless communications apparatus that enables managing interference in a heterogeneous wireless communication environment, comprising:
means for determining a first transmit power for a transmission symbol from a puncturing pattern as a function of a cell identifier (ID) of an interfering base station and a first transmit time in a first subframe and determining a second transmit power for a second transmission symbol from the puncturing pattern as a function of the cell ID and a second transmit time in a second subframe,
wherein the puncturing pattern is defined on a subframe basis and sets the first transmit power for the first transmission symbol in the first subframe from a frame at a first level and sets a transmit power for a second transmission symbol in the second subframe from the frame at a second level that is lower than the first level; and
means for sending the first transmission symbol at the first transmit power and sending the second transmission symbol at the second transmit power.

29. The wireless communications apparatus of claim 28, wherein the transmission symbol is a Physical Broadcast Channel (PBCH) symbol.

30. The wireless communications apparatus of claim 28, wherein the cell ID is one of a femto cell ID or a macro cell ID.

31. The wireless communications apparatus of claim 28, further comprising means for reducing a transmit power of a Physical Downlink Shared Channel (PDSCH) transmission on a center six resource blocks when the PDSCH transmission collides with Physical Broadcast Channel (PBCH) signals from a neighbor base station.

32. The wireless communications apparatus of claim 28, wherein the puncturing pattern hops over time.

33. The wireless communications apparatus of claim 28, wherein the puncturing pattern clusters punctured transmission symbols in a frame.

34. The wireless communications apparatus of claim 28, wherein the puncturing pattern distributes punctured transmission symbols at least one of in a frame or across multiple frames.

35. A computer program product, comprising:
a non-transitory computer-readable medium comprising:
code for determining a first transmit power for a first transmission symbol from a puncturing pattern as a function of a cell identifier (ID) of an interfering base station and a first transmit time in a first subframe;
code for determining a second transmit power for a second transmission symbol from the puncturing pattern as a function of the cell ID and a second transmit time in a second subframe,
wherein the puncturing pattern is defined on a subframe basis and sets the first transmit power for the first transmission symbol in the first subframe from a frame at a first level and sets the second transmit power for the second transmission symbol in the second subframe from the frame at a second level that is lower than the first;
code for sending the first transmission symbol at the first transmit power; and
code for sending the second transmission symbol at the second transmit power.

36. The computer program product of claim 35, wherein the transmission symbol is a Physical Broadcast Channel (PBCH) symbol.

37. The computer program product of claim 35, wherein the computer-readable medium further comprises code for reducing a transmit power of a Physical Downlink Shared Channel (PDSCH) transmission on a center six resource blocks when the PDSCH transmission collides with Physical Broadcast Channel (PBCH) signals from a neighbor base station.

38. A wireless communications apparatus, comprising:
a processor configured to:
determine a first transmit power for a first transmission symbol from a puncturing pattern as a function of a cell identifier (ID) of an interfering base station and a first transmit time in a first subframe;
determine a second transmit power for a second transmission symbol from the puncturing pattern as a function of the cell ID and a second transmit time in a second subframe, wherein the puncturing pattern is defined on a subframe basis and sets the first transmit power for the first transmission symbol in the first subframe from a frame at a first level and sets a transmit power for the second transmission symbol in the second subframe from the frame at a second level that is lower than the first level;

send the first transmission symbol at the first transmit power; and send the second transmission symbol at the second transmit power.

39. A wireless communications apparatus that enables managing interference in a wireless communication environment, comprising:

means for determining a first transmit power for a first transmission symbol from a puncturing pattern as a function of a cell identifier (ID) of an interfering base station and a first transmit time and determining a second transmit power for a second transmission symbol from the puncturing pattern as a function of the cell ID and a second transmit time, wherein the puncturing pattern is defined on a symbol basis and sets a transmit power for the first transmission symbol from a frame at a first level and sets a transmit power for the second transmission symbol from the frame at a second level that is lower than the first level to puncture the second transmission symbol; and means for sending the first transmission symbol at the first transmit power and sending the second transmission symbol at the second transmit power.

40. A computer program product, comprising:

a non-transitory computer-readable medium comprising:

code for determining a first transmit power for a first transmission symbol from a puncturing pattern as a function of a cell identifier (ID) of an interfering base station and a first transmit time;

code for determining a second transmit power for a second transmission symbol from the puncturing pattern as a function of the cell ID and a second transmit time, wherein the puncturing pattern is defined on a symbol basis and sets a transmit power for the first transmission symbol from a frame at a first level and sets a transmit power for the second transmission symbol from the frame at a second level that is lower than the first level to puncture the second transmission symbol;

code for sending the first transmission symbol at the first transmit power; and code for sending the second transmission symbol at the second transmit power.

41. A wireless communications apparatus, comprising:

a processor configured to:

determine a first transmit power for a first transmission symbol from a puncturing pattern as a function of a cell identifier (ID) of an interfering base station and a first transmit time;

determine a second transmit power for a second transmission symbol from the puncturing pattern as a function of the cell ID and a second transmit time, wherein the puncturing pattern is defined on a symbol basis and sets a transmit power for the first transmission symbol from a frame at a first level and sets a transmit power for the second transmission symbol from the frame at a second level that is lower than the first level to puncture the second transmission symbol;

send the first transmission symbol at the first transmit power; and send the second transmission symbol at the second transmit power.

* * * * *